United States Patent
Rule et al.

(10) Patent No.: US 12,489,747 B2
(45) Date of Patent: Dec. 2, 2025

(54) SYSTEMS AND TECHNIQUES TO PERFORM VERIFICATION OPERATIONS WITH WIRELESS COMMUNICATION

(71) Applicant: Capital One Services, LLC, McLean, VA (US)

(72) Inventors: Jeffrey Rule, Chevy Chase, MD (US); Kevin Osborn, Newton Highlands, MA (US); Wayne Lutz, Fort Washington, MD (US)

(73) Assignee: Capital One Services, LLC., McLean, VA (US)

( * ) Notice: Subject to any disclaimer, the term of this patent is extended or adjusted under 35 U.S.C. 154(b) by 73 days.

(21) Appl. No.: 17/990,132

(22) Filed: Nov. 18, 2022

(65) Prior Publication Data

US 2024/0171570 A1   May 23, 2024

(51) Int. Cl.
    *H04L 9/40* (2022.01)

(52) U.S. Cl.
    CPC ........ *H04L 63/0853* (2013.01); *H04L 63/126* (2013.01)

(58) Field of Classification Search
    CPC ............... H04L 63/0853; H04L 63/126; H04L 63/0435; H04L 2463/082; G06Q 20/353; G06Q 20/3823; G06Q 20/401; G06Q 20/405; G06Q 20/352; G06Q 20/3278; H04W 12/033; H04W 4/80; H04W 12/041; H04W 12/06
    See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,778,072 A | 7/1998 | Samar |
| 5,796,827 A | 8/1998 | Coppersmith et al. |
| 5,883,810 A | 3/1999 | Franklin et al. |

(Continued)

FOREIGN PATENT DOCUMENTS

| | | |
|---|---|---|
| KR | 20150140132 A | 12/2015 |
| WO | 9910824 A1 | 3/1999 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Abiy Getachew
(74) *Attorney, Agent, or Firm* — KDW FIRM PLLC

(57) ABSTRACT

Techniques generally directed to performing verification techniques with one or more wireless interfaces based on a provided pattern.

20 Claims, 19 Drawing Sheets

(56) References Cited

U.S. PATENT DOCUMENTS

| | | |
|---|---|---|
| 5,901,874 A | 5/1999 | Deters |
| 5,960,411 A | 9/1999 | Hartman et al. |
| 6,049,328 A | 4/2000 | Vanderheiden |
| 6,058,373 A | 5/2000 | Blinn et al. |
| 6,061,666 A | 5/2000 | Do et al. |
| 6,199,762 B1 | 3/2001 | Hohle |
| 6,227,447 B1 | 5/2001 | Campisano |
| 6,324,271 B1 | 11/2001 | Sawyer et al. |
| 6,342,844 B1 | 1/2002 | Rozin |
| 6,367,011 B1 | 4/2002 | Lee et al. |
| 6,501,847 B2 | 12/2002 | Helot et al. |
| 6,572,015 B1 | 6/2003 | Norton |
| 6,631,197 B1 | 10/2003 | Taenzer |
| 6,662,020 B1 | 12/2003 | Aaro et al. |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,873,260 B2 | 3/2005 | Lancos et al. |
| 6,877,656 B1 | 4/2005 | Jaros et al. |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,165,727 B2 | 1/2007 | de Jong |
| 7,175,076 B1 | 2/2007 | Block et al. |
| 7,202,773 B1 | 4/2007 | Oba et al. |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,287,692 B1 | 10/2007 | Patel et al. |
| 7,290,709 B2 | 11/2007 | Tsai et al. |
| 7,319,986 B2 | 1/2008 | Praisner et al. |
| 7,374,099 B2 | 5/2008 | de Jong |
| 7,375,616 B2 | 5/2008 | Rowse et al. |
| 7,472,829 B2 | 1/2009 | Brown |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,652,578 B2 | 1/2010 | Braun et al. |
| 7,703,142 B1 | 4/2010 | Wilson et al. |
| 7,748,609 B2 | 7/2010 | Sachdeva et al. |
| 7,793,851 B2 | 9/2010 | Mullen |
| 7,805,755 B2 | 9/2010 | Brown et al. |
| 7,827,115 B2 | 11/2010 | Weller et al. |
| 7,900,048 B2 | 3/2011 | Andersson |
| 7,908,216 B1 | 3/2011 | Davis et al. |
| 7,922,082 B2 | 4/2011 | Muscato |
| 7,954,723 B2 | 6/2011 | Charrat |
| 7,962,369 B2 | 6/2011 | Rosenberg |
| 8,005,426 B2 | 8/2011 | Huomo et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,095,113 B2 | 1/2012 | Kean et al. |
| 8,099,332 B2 | 1/2012 | Lemay et al. |
| 8,108,687 B2 | 1/2012 | Ellis et al. |
| 8,140,010 B2 | 3/2012 | Symons et al. |
| 8,150,321 B2 | 4/2012 | Winter et al. |
| 8,150,767 B2 | 4/2012 | Wankmueller |
| 8,196,131 B1 | 6/2012 | von Behren et al. |
| 8,215,563 B2 | 7/2012 | Levy et al. |
| 8,233,841 B2 | 7/2012 | Griffin et al. |
| 8,276,814 B1 | 10/2012 | Davis |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,381,307 B2 | 2/2013 | Cimino |
| 8,439,271 B2 | 5/2013 | Smets et al. |
| 8,489,112 B2 | 7/2013 | Roeding et al. |
| 8,511,547 B2 | 8/2013 | Rans |
| 8,519,822 B2 | 8/2013 | Riegebauer |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,615,468 B2 | 12/2013 | Varadarajan |
| 8,723,941 B1 | 5/2014 | Shirbabadi et al. |
| 8,750,514 B2 | 6/2014 | Gallo et al. |
| 8,752,189 B2 | 6/2014 | de Jong |
| 8,818,867 B2 | 8/2014 | Baldwin et al. |
| 8,850,538 B1 | 9/2014 | Vernon et al. |
| 8,870,081 B2 | 10/2014 | Olson |
| 9,038,893 B2 | 5/2015 | Kirkham |
| 9,038,894 B2 | 5/2015 | Khalid |
| 9,047,531 B2 | 6/2015 | Showering et al. |
| 9,069,976 B2 | 6/2015 | Toole et al. |
| 9,118,663 B1 | 8/2015 | Bailey et al. |
| 9,129,199 B2 | 9/2015 | Spodak |
| 9,183,490 B2 | 11/2015 | Moreton |
| 9,209,867 B2 | 12/2015 | Royston |
| 9,275,325 B2 | 3/2016 | Newcombe |
| 9,286,606 B2 | 3/2016 | Diamond |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,373,141 B1 | 6/2016 | Shakkarwar |
| 9,379,841 B2 | 6/2016 | Fine et al. |
| 9,413,768 B1 | 8/2016 | Gregg et al. |
| 9,432,339 B1 | 8/2016 | Bowness |
| 9,501,776 B2 | 11/2016 | Martin |
| 9,635,000 B1 | 4/2017 | Muftic |
| 9,710,744 B2 | 7/2017 | Wurmfeld |
| 9,773,151 B2 | 9/2017 | Mil'shtein et al. |
| 9,891,823 B2 | 2/2018 | Feng et al. |
| 9,940,571 B1 | 4/2018 | Herrington |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,129,648 B1 | 11/2018 | Hernandez et al. |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |

(56) References Cited

U.S. PATENT DOCUMENTS

| | | |
|---|---|---|
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2002/0078345 A1 | 6/2002 | Sandhu et al. |
| 2002/0093530 A1 | 7/2002 | Krothapalli et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0055727 A1 | 3/2003 | Walker et al. |
| 2003/0167350 A1 | 9/2003 | Davis et al. |
| 2003/0220876 A1 | 11/2003 | Burger |
| 2004/0015958 A1 | 1/2004 | Veil et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0044153 A1 | 3/2006 | Dawidowsky |
| 2006/0047954 A1 | 3/2006 | Sachdeva et al. |
| 2006/0136334 A1 | 6/2006 | Atkinson et al. |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0116292 A1 | 5/2007 | Kurita et al. |
| 2007/0118745 A1 | 5/2007 | Buer |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2008/0008315 A1 | 1/2008 | Fontana et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0099552 A1 | 5/2008 | Grillion |
| 2008/0103968 A1 | 5/2008 | Bies et al. |
| 2008/0110983 A1 | 5/2008 | Ashfield |
| 2008/0156873 A1 | 7/2008 | Wilhelm et al. |
| 2008/0164308 A1 | 7/2008 | Aaron et al. |
| 2008/0223918 A1 | 9/2008 | Williams et al. |
| 2008/0285746 A1 | 11/2008 | Landrock et al. |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0211797 A1 | 8/2010 | Westerveld et al. |
| 2010/0240413 A1 | 9/2010 | He et al. |
| 2010/0312634 A1 | 12/2010 | Cervenka |
| 2010/0312635 A1 | 12/2010 | Cervenka |
| 2011/0035604 A1 | 2/2011 | Habraken |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0131415 A1 | 6/2011 | Schneider |
| 2011/0153437 A1 | 6/2011 | Archer et al. |
| 2011/0155801 A1 | 6/2011 | Rowberry |
| 2011/0208965 A1 | 8/2011 | Machani |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0294418 A1 | 12/2011 | Chen |
| 2011/0312271 A1 | 12/2011 | Ma et al. |
| 2012/0030047 A1 | 2/2012 | Fuentes et al. |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0178366 A1 | 7/2012 | Levy et al. |
| 2012/0209773 A1 | 8/2012 | Ranganathan |
| 2012/0254394 A1 | 10/2012 | Barras |
| 2012/0290472 A1 | 11/2012 | Mullen et al. |
| 2012/0309302 A1* | 12/2012 | Buhot ................ G06K 7/10237 455/41.1 |
| 2012/0316992 A1 | 12/2012 | Oborne |
| 2012/0317035 A1 | 12/2012 | Royyuru et al. |
| 2013/0026229 A1 | 1/2013 | Jarman et al. |
| 2013/0030997 A1 | 1/2013 | Spodak |
| 2013/0065564 A1 | 3/2013 | Conner et al. |
| 2013/0080228 A1 | 3/2013 | Fisher |
| 2013/0119130 A1 | 5/2013 | Braams |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0311363 A1 | 11/2013 | Ramaci |
| 2013/0314593 A1 | 11/2013 | Reznik et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0040120 A1 | 2/2014 | Cho et al. |
| 2014/0040147 A1 | 2/2014 | Varadarakan et al. |
| 2014/0047235 A1 | 2/2014 | Lessiak et al. |
| 2014/0065948 A1* | 3/2014 | Huang .................. H02J 7/0045 361/679.01 |
| 2014/0074655 A1 | 3/2014 | Lim et al. |
| 2014/0081785 A1 | 3/2014 | Valadas Preto |
| 2014/0138435 A1 | 5/2014 | Khalid |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0258099 A1 | 9/2014 | Rosano |
| 2014/0274179 A1 | 9/2014 | Zhu et al. |
| 2014/0337235 A1 | 11/2014 | Van Heerden et al. |
| 2014/0346860 A1 | 11/2014 | Aubry et al. |
| 2014/0365377 A1 | 12/2014 | Salama |

(56) References Cited

U.S. PATENT DOCUMENTS

| | | |
|---|---|---|
| 2015/0071486 A1 | 3/2015 | Rhoads et al. |
| 2015/0073983 A1 | 3/2015 | Bartenstein |
| 2015/0113271 A1 | 4/2015 | Jooste |
| 2015/0134513 A1 | 5/2015 | Olson |
| 2015/0154595 A1 | 6/2015 | Collinge et al. |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0317295 A1 | 11/2015 | Sherry |
| 2015/0371234 A1 | 12/2015 | Huang et al. |
| 2016/0026997 A1 | 1/2016 | Tsui et al. |
| 2016/0048913 A1 | 2/2016 | Rausaria et al. |
| 2016/0065370 A1 | 3/2016 | Le Saint et al. |
| 2016/0078430 A1 | 3/2016 | Douglas |
| 2016/0148193 A1 | 5/2016 | Kelley et al. |
| 2016/0189143 A1 | 6/2016 | Koeppel |
| 2016/0255072 A1 | 9/2016 | Liu |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0330027 A1 | 11/2016 | Ebrahimi |
| 2016/0335531 A1 | 11/2016 | Mullen et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0068950 A1 | 3/2017 | Kwon |
| 2017/0077594 A1* | 3/2017 | Sugimoto ............... H01Q 15/14 |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0180134 A1 | 6/2017 | King |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0205712 A1 | 7/2018 | Versteeg et al. |
| 2018/0240106 A1 | 8/2018 | Garrett et al. |
| 2018/0268132 A1 | 9/2018 | Buer et al. |
| 2018/0270214 A1 | 9/2018 | Caterino et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0322486 A1 | 11/2018 | Deliwala et al. |
| 2018/0359100 A1 | 12/2018 | Gaddam et al. |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0364716 A1* | 11/2020 | Pickering ................ G06F 21/44 |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| WO | 2017047855 A1 | 3/2017 |
| WO | 2019022585 A1 | 1/2019 |
| WO | 2020072353 A1 | 4/2020 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the

(56) References Cited

OTHER PUBLICATIONS

Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

The International Search Report and Written Opinion mailed Mar. 19, 2024, in corresponding PCT/US23/080040 (15 pages).

Buriro et al., "Please Hold On: Unobtrusive User Authentication using Smartphone's built-in Sensors", 2017 IEEE International Conference on Identity, Security and Behavior Analysis (ISBA), New Delhi, India, 2017, pp. 1-8, doi: 10.1109/ISBA.2017.7947684.

Yohan et al., "Dynamic Multi-factor Authentication for Smartphone", 2016 IEEE 27th Annual International Symposium on Personal, Indoor, and Mobile Radio Communications (PIMRC), Valencia, Spain, 2016, pp. 1-6, doi: 10.1109/PIMRC.2016.7794966.

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

SYSTEMS AND TECHNIQUES TO PERFORM VERIFICATION OPERATIONS WITH WIRELESS COMMUNICATION

BACKGROUND

As user devices such as mobile phones continue to increase in popularity, ensuring that access to data and private information is securely provisioned and maintained on the user devices continues to be a concern. For instance, in order to access a mobile device or an application executing on the mobile device, it is typically necessary to authenticate a user prior to providing access. However, attackers attempt to circumvent security measures by stealing passwords and eavesdropping on users during the registration and authentication processes (e.g., by conducting a man-in-the-middle attack). Thus, an attacker may attempt to intercept data, such as a public key, that can be used to infer the identity of a user, a user device, or a server computer. An attacker may also attempt intercepting authentication data, such as a password or response to a challenge. The intercepted data could be used to track the user's device, or it may be used for illicit purposes. Embodiments discussed herein are directed to providing additional security measures harder for attackers to steal and gain access.

BRIEF SUMMARY

Embodiments are generally directed to systems and methods to perform verification operations with wireless interfaces. In one example, a system may perform a method, comprising detecting, via a first short-range communication antenna of a mobile device, one or more communications with a contactless card based on the contactless card coming within the communication range of the first short-range communication antenna of the mobile device, detecting, via a second short-range communication antenna of the mobile device, one or more different communications with the contactless card based on the contactless card coming within communication range of the second short-range communication antenna of the mobile device, wherein the first short-range communication antenna and the second short-range communication antenna or different antennas; determining, by a processor of the mobile device, a pattern in the one or more communication and the one or more different communications; determining, by the processor, that the pattern matches a verified pattern; and enabling, by the processor, an operation to execute in response to the pattern matching the verified pattern.

Embodiments may also include an apparatus, comprising a first short-range communication antenna, a second short-range communication antenna, a memory configured to store instructions, and a processor coupled with the memory, the first short-range communication antenna, and the second short-range communication antenna, the processor configured to process the instructions. The instructions, when executed by the processor, to cause the processor to detect a pattern of communications received by the first short-range communication antenna, the second short-range communication antenna, or both, determine the pattern matches a verified pattern to perform an operation, and perform the operation based on the pattern matching the verified pattern.

In another example, embodiments may include a memory, storage, or a computer-readable medium comprising instructions that, when executed by a processor, causes the processor to receive, by a first near-field communication (NFC) antenna, a second NFC antenna, or both, two or more communications from a contactless card, determine a pattern in the two or more communications, compare the pattern to a verified pattern, determine whether the pattern matches the verified pattern, in response to the pattern matching the verified pattern, enable an operation to be performed, and in response to the pattern not matching the verified pattern, prevent the operation from being performed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments are generally directed to increasing security in computing environments by utilizing a contactless card to provide input patterns. As discussed, mobile devices are becoming more and more ubiquitous. The potential for a hacker to steal or access a user's device has never been higher. Today's devices include security measures, requiring users to enter passwords, PINs, or patterns to access the device. However, these measures are flawed. A hacker easily can steal or obtain a password, pin, or pattern by visually observing the user enter the security measure.

Embodiments discussed herein are advantageous over these and other measures by enabling a security measure to be entered in a manner that is not easily observable to an attacker. Specifically, embodiments enable a user to utilize their contactless card, such as a debit card, credit card, rewards card, etc., to enter a pattern of inputs by discretely interacting with a mobile device. The user may provide a pattern of inputs by 'tapping' the contactless card on or near one or more antennas that are already provided in the mobile device. As will be discussed in more detail in the following description, the pattern may include various characteristics of each of the inputs, e.g., which antenna is used, length of tap, a length between, sequence of taps, etc.

In embodiments, 'tap' authentication may be used with additional authentication utilizing the contactless card to create a multi-factor authentication security measure utilizing a single object, e.g., the card. As discussed throughout the Specification, the contactless card itself may be used a token, e.g., a thing you have, and data on the card may be authenticated. Thus, the contactless card may provide data to a device that can be authenticated. Then, the user may use the card to provide inputs on the device as part of a multi-factor authentication process. In some instances, providing the data and tapping may occur currently. For example, the device may be configured to perform read operation(s) during the tapping and register each 'tap' to detect a pattern. These and additional details are discussed in the following description.

Figure 1:
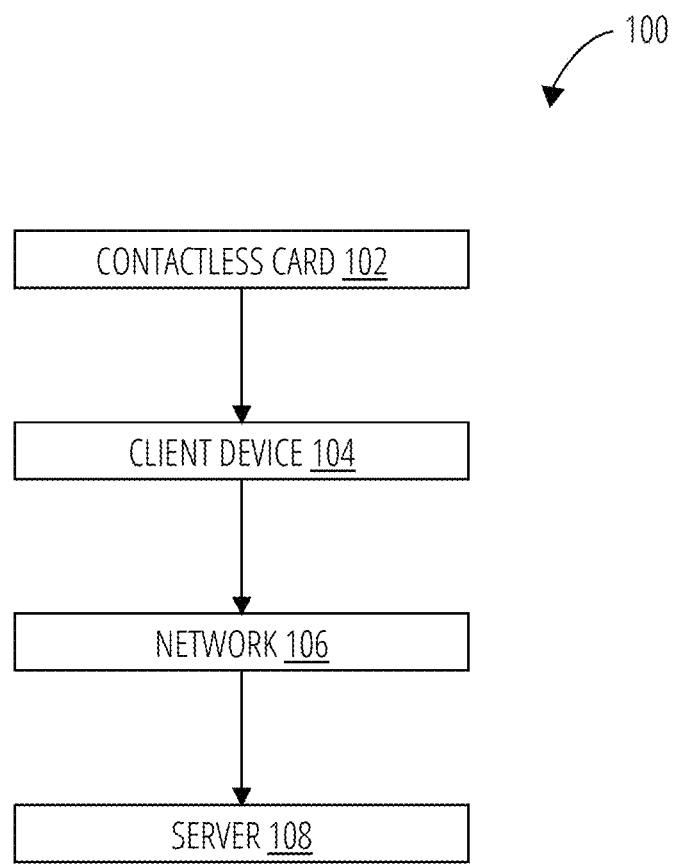
FIG. 1 illustrates an aspect of the subject matter in accordance with one embodiment.

FIG. 1 illustrates a data transmission system 100 according to an example embodiment. As further discussed below, system 100 may include contactless card 102, client device 104, network 106, and server 108. Although FIG. 1 illustrates single instances of the components, system 100 may include any number of components.

System 100 may include one or more contactless cards 102, which are further explained below. In some embodiments, contactless card 102 may be in wireless communication, utilizing NFC in an example, with client device 104.

System 100 may include client device 104, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 104 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 104 of system 100 may execute one or more applications, such as software applications, that enable, for example, network communications with one or more components of system 100 and transmit and/or receive data.

The client device 104 may be in communication with one or more server(s) 108 via one or more network(s) 106, and may operate as a respective front-end to back-end pair with server 108. The client device 104 may transmit, for example from a mobile device application executing on client device 104, one or more requests to server 108. The one or more requests may be associated with retrieving data from server 108. The server 108 may receive the one or more requests from client device 104. Based on the one or more requests from client device 104, server 108 may be configured to retrieve the requested data from one or more databases (not shown). Based on receipt of the requested data from the one or more databases, server 108 may be configured to transmit the received data to client device 104, the received data being responsive to one or more requests.

System 100 may include one or more networks 106. In some examples, network 106 may be one or more of a wireless network, a wired network or any combination of wireless network and wired network, and may be configured to connect client device 104 to server 108. For example, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, network 106 may include, without limitation, telephone lines, fiber optics, IEEE Ethernet 802.3, a wide area network, a wireless personal area network, a LAN, or a global network such as the Internet. In addition, network 106 may support an Internet network, a wireless communication network, a cellular network, or the like, or any combination thereof. network 106 may further include one network, or any number of the exemplary types of networks mentioned above, operating as a stand-alone network or in cooperation with each other. network 106 may utilize one or more protocols of one or more network elements to which they are communicatively coupled. network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

System 100 may include one or more servers 108. In some examples, server 108 may include one or more processors, which are coupled to memory. The server 108 may be configured as a central system, server or platform to control and call various data at different times to execute a plurality of workflow actions. Server 120 may be configured to connect to the one or more databases. The server 108 may be connected to at least one client device 104.

Figure 2:
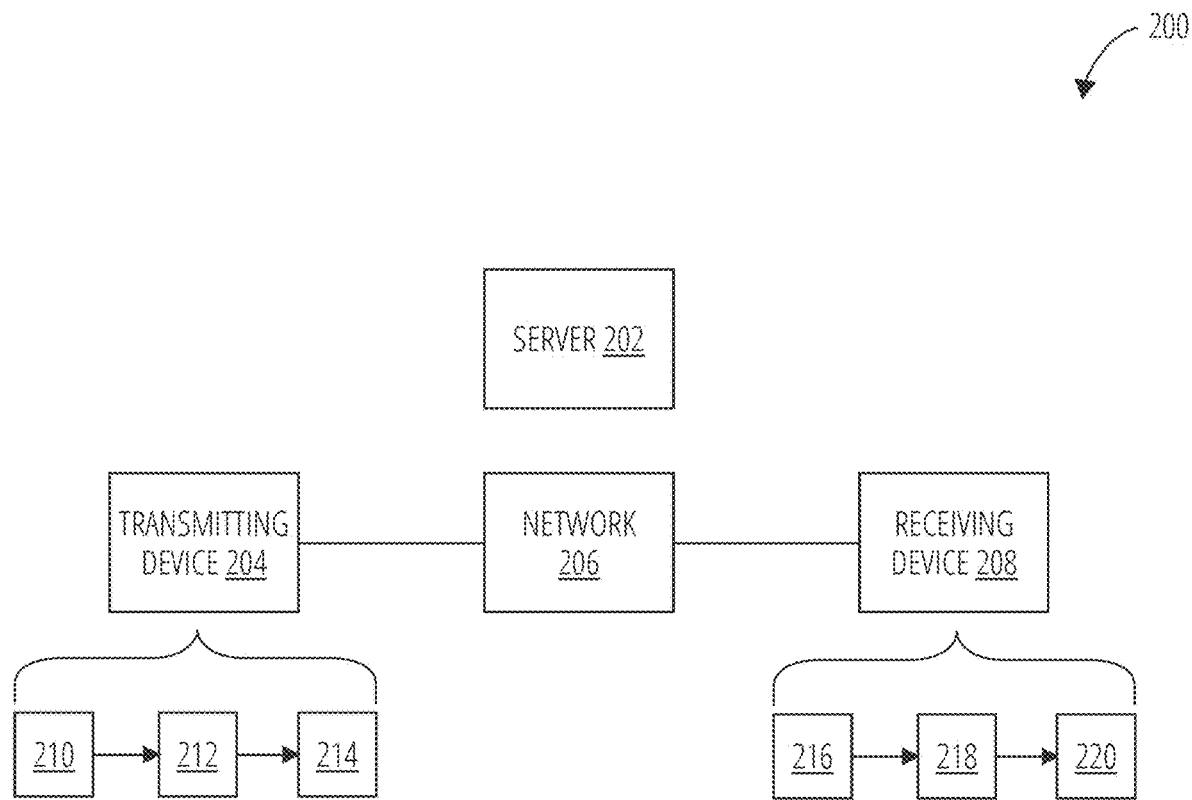
FIG. 2 illustrates an aspect of the subject matter in accordance with one embodiment.

FIG. 2 illustrates a data transmission system according to an example embodiment. System 200 may include a transmitting or transmitting device 204, a receiving or receiving device 208 in communication, for example via network 206, with one or more servers 202. Transmitting or transmitting device 204 may be the same as, or similar to, client device 110 discussed above with reference to FIG. 1A. Receiving or receiving device 208 may be the same as, or similar to, client device 110 discussed above with reference to FIG. 1A. Network 206 may be similar to network 115 discussed above with reference to FIG. 1A. Server 202 may be similar to server 120 discussed above with reference to FIG. 1A. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective devices 204 and 208. As explained above, although single instances of transmitting device 204 and receiving device 208 may be included, it is understood that one or more transmitting devices 204 and one or more receiving devices 208 may be involved so long as each party shares the same shared secret symmetric key. In some examples, the transmitting device 204 and receiving device 208 may be provisioned with the same master symmetric key. Further, it is understood that any party or device holding the same secret symmetric key may perform the functions of the transmitting device 204 and similarly any party holding the same secret symmetric key may perform the functions of the receiving device 208. In some examples, the symmetric key may comprise the shared secret symmetric key which is kept secret from all parties other than the transmitting device 204 and the receiving device 208 involved in exchanging the secure data. It is further understood that both the transmitting device 204 and receiving device 208 may be provided with the same master symmetric key, and further that part of the data exchanged between the transmitting device 204 and receiving device 208 comprises at least a portion of data which may be referred to as the counter value. The counter value may comprise a number that changes each time data is exchanged between the transmitting device 204 and the receiving device 208.

System 200 may include one or more networks 206. In some examples, network 206 may be one or more of a wireless network, a wired network or any combination of wireless network and wired network, and may be configured to connect one or more transmitting devices 204 and one or more receiving devices 208 to server 202. For example, network 206 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, Wi-Fi, and/or the like.

In addition, network 206 may include, without limitation, telephone lines, fiber optics, IEEE Ethernet 902.3, a wide area network, a wireless personal area network, a LAN, or a global network such as the Internet. In addition, network 206 may support an Internet network, a wireless communication network, a cellular network, or the like, or any combination thereof. Network 206 may further include one network, or any number of the exemplary types of networks mentioned above, operating as a stand-alone network or in cooperation with each other. Network 206 may utilize one or more protocols of one or more network elements to which they are communicatively coupled. Network 206 may translate to or from other protocols to one or more protocols of network devices. Although network 206 is depicted as a single network, it should be appreciated that according to one or more examples, network 206 may comprise a plurality of interconnected networks, such as, for example, the Internet, a service provider's network, a cable television network, corporate networks, such as credit card association networks, and home networks.

In some examples, one or more transmitting devices 204 and one or more receiving devices 208 may be configured to communicate and transmit and receive data between each other without passing through network 206. For example, communication between the one or more transmitting devices 204 and the one or more receiving devices 208 may occur via at least one of NFC, Bluetooth, RFID, Wi-Fi, and/or the like.

At block 210, when the transmitting device 204 is preparing to process the sensitive data with symmetric cryptographic operation, the sender may update a counter. In addition, the transmitting device 204 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 212, the transmitting device 204 may take the selected cryptographic algorithm, and using the master symmetric key, process the counter value. For example, the sender may select a symmetric encryption algorithm, and use a counter which updates with every conversation between the transmitting device 204 and the receiving device 208. The transmitting device 204 may then encrypt the counter value with the selected symmetric encryption algorithm using the master symmetric key, creating a diversified symmetric key.

In some examples, the counter value may not be encrypted. In these examples, the counter value may be transmitted between the transmitting device 204 and the receiving device 208 at block 212 without encryption.

At block 214, the diversified symmetric key may be used to process the sensitive data before transmitting the result to the receiving device 208. For example, the transmitting device 204 may encrypt the sensitive data using a symmetric encryption algorithm using the diversified symmetric key, with the output comprising the protected encrypted data. The transmitting device 204 may then transmit the protected encrypted data, along with the counter value, to the receiving device 208 for processing.

At block 216, the receiving device 208 may first take the counter value and then perform the same symmetric encryption using the counter value as input to the encryption, and the master symmetric key as the key for the encryption. The output of the encryption may be the same diversified symmetric key value that was created by the sender.

At block 218, the receiving device 208 may then take the protected encrypted data and using a symmetric decryption algorithm along with the diversified symmetric key, decrypt the protected encrypted data.

At block 220, as a result of the decrypting the protected encrypted data, the original sensitive data may be revealed.

The next time sensitive data needs to be sent from the sender to the recipient via respective transmitting device 204 and receiving device 208, a different counter value may be selected producing a different diversified symmetric key. By processing the counter value with the master symmetric key and same symmetric cryptographic algorithm, both the transmitting device 204 and receiving device 208 may independently produce the same diversified symmetric key. This diversified symmetric key, not the master symmetric key, is used to protect the sensitive data.

As explained above, both the transmitting device 204 and receiving device 208 each initially possess the shared master symmetric key. The shared master symmetric key is not used to encrypt the original sensitive data. Because the diversified symmetric key is independently created by both the transmitting device 204 and receiving device 208, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 204 and the receiving device 208 may be governed by symmetric requirements for how often to create a new diversification value, and therefore a new diversified symmetric key. In an embodiment, a new diversification value and therefore a new diversified symmetric key may be created for every exchange between the transmitting device 204 and receiving device 208.

In some examples, the key diversification value may comprise the counter value. Other non-limiting examples of the key diversification value include: a random nonce generated each time a new diversified key is needed, the random nonce sent from the transmitting device 204 to the receiving device 208; the full value of a counter value sent from the transmitting device 204 and the receiving device 208; a portion of a counter value sent from the transmitting device 204 and the receiving device 208; a counter independently maintained by the transmitting device 204 and the receiving device 208 but not sent between the two devices; a one-time-passcode exchanged between the transmitting device 204 and the receiving device 208; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 204 and the receiving device 208. In effect, this may create a one-time use key, such as a single-use session key.

Figure 3:
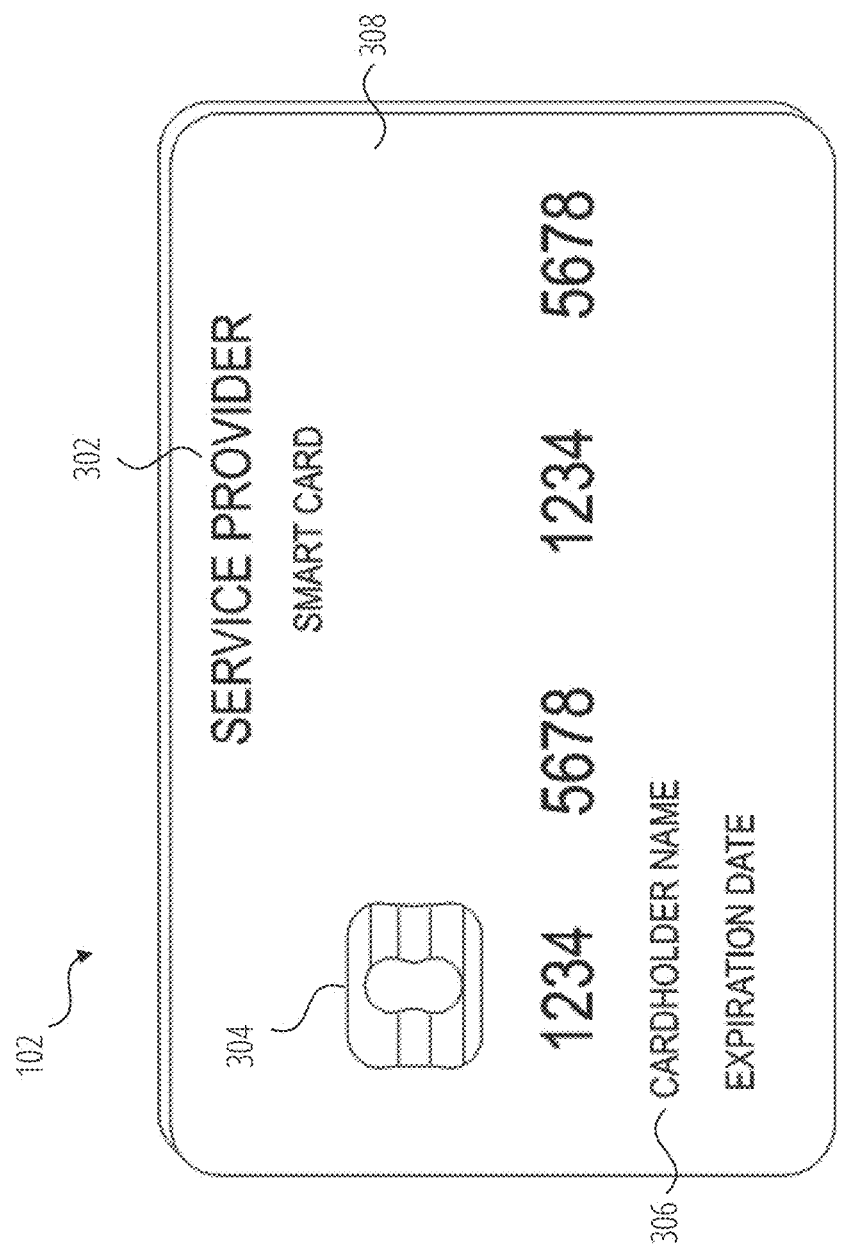
FIG. 3 illustrates a contactless card 102 in accordance with one embodiment.

FIG. 3 illustrates an example configuration of a contactless card 102, which may include a contactless card, a payment card, such as a credit card, debit card, or gift card, issued by a service provider as displayed as service provider indicia 302 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 308, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard.

However, it is understood that the contactless card 102 according to the present disclosure may have different characteristics, and the present disclosure does not require a transaction card to be implemented in a payment card.

Figure 4:
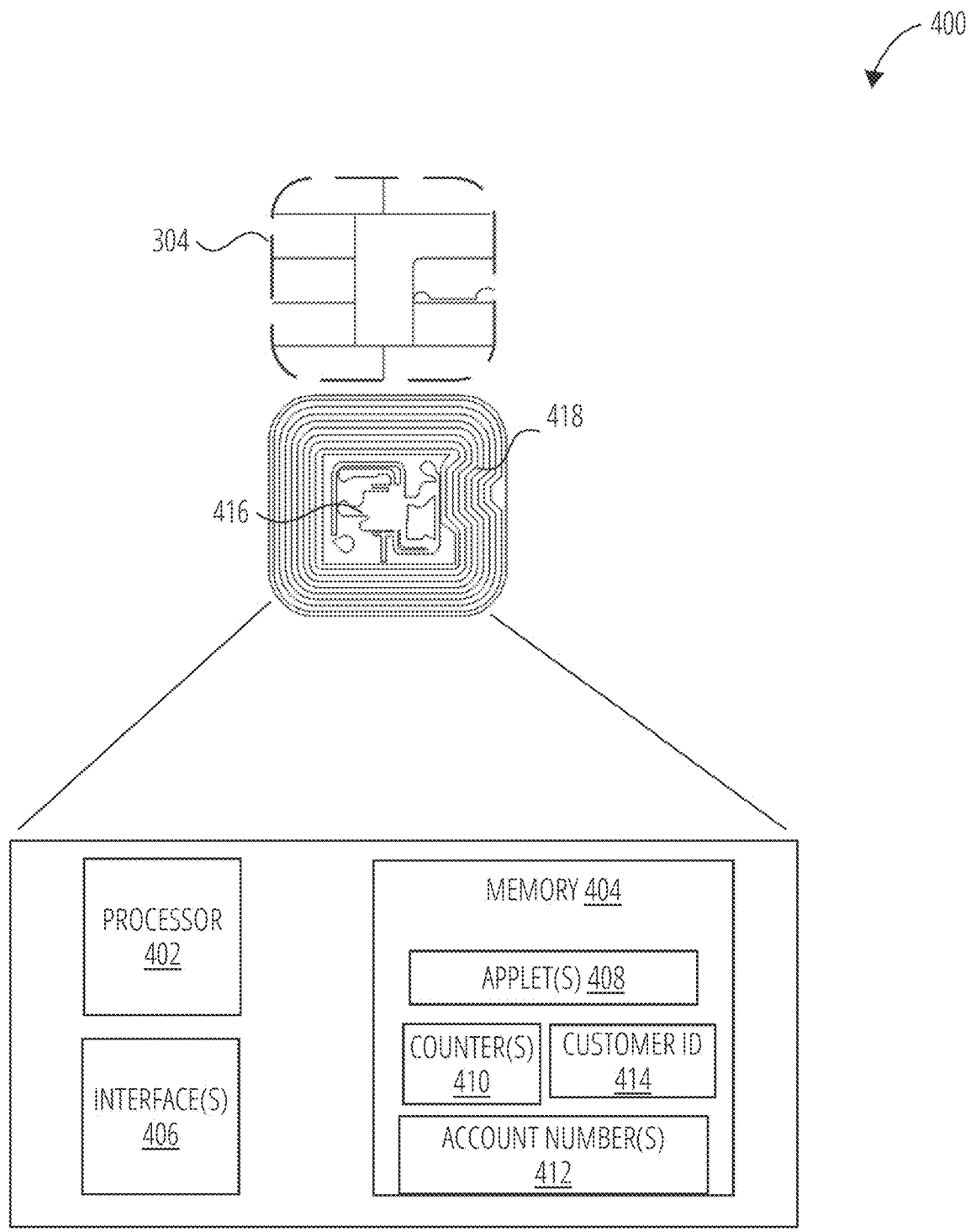
FIG. 4 illustrates a transaction card component 400 in accordance with one embodiment.

The contactless card 102 may also include identification information 306 displayed on the front and/or back of the card, and a contact pad 304. The contact pad 304 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 4. These components may be located behind the contact pad 304 or elsewhere on the substrate 308, e.g. within a different layer of the substrate 308, and may electrically and physically coupled with the contact pad 304. The contactless card 102 may also include a magnetic strip or tape, which may be located on the back of the card (not shown in FIG. 3). The contactless card 102 may also include a Near-Field Communication (NFC) device coupled with an antenna capable of communicating via the NFC protocol. Embodiments are not limited in this manner.

As illustrated in FIG. 2, the contact pad 304 of contactless card 102 may include processing circuitry 416 for storing, processing, and communicating information, including a processor 402, a memory 404, and one or more interface(s) 406. It is understood that the processing circuitry 416 may contain additional components, including processors, memories, error and parity/CRC checkers, data encoders, anticollision algorithms, controllers, command decoders, security primitives and tamperproofing hardware, as necessary to perform the functions described herein.

The memory 404 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypted data.

The memory 404 may be configured to store one or more applet(s) 408, one or more counter(s) 410, a customer identifier 414, and the account number(s) 412, which may be virtual account numbers. The one or more applet(s) 408 may comprise one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s) 410 may comprise a numeric counter sufficient to store an integer. The customer identifier 414 may comprise a unique alphanumeric identifier assigned to a user of the contactless card 102, and the identifier may distinguish the user of the contactless card from other contactless card users. In some examples, the customer identifier 414 may identify both a customer and an account assigned to that customer and may further identify the contactless card 102 associated with the customer's account. As stated, the account number(s) 412 may include thousands of one-time use virtual account numbers associated with the contactless card 102. An applet(s) 408 of the contactless card 102 may be configured to manage the account number(s) 412 (e.g., to select an account number(s) 412, mark the selected account number(s) 412 as used, and transmit the account number(s) 412 to a mobile device for autofilling by an autofilling service.

The processor 402 and memory elements of the foregoing exemplary embodiments are described with reference to the contact pad 304, but the present disclosure is not limited thereto. It is understood that these elements may be implemented outside of the contact pad 304 or entirely separate from it, or as further elements in addition to processor 402 and memory 404 elements located within the contact pad 304.

In some examples, the contactless card 102 may comprise one or more antenna(s) 418. The one or more antenna(s) 418 may be placed within the contactless card 102 and around the processing circuitry 416 of the contact pad 304. For example, the one or more antenna(s) 418 may be integral with the processing circuitry 416 and the one or more antenna(s) 418 may be used with an external booster coil. As another example, the one or more antenna(s) 418 may be external to the contact pad 304 and the processing circuitry 416.

In an embodiment, the coil of contactless card 102 may act as the secondary of an air core transformer. The terminal may communicate with the contactless card 102 by cutting power or amplitude modulation. The contactless card 101 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 418, processor 402, and/or the memory 404, the contactless card 101 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s) 408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter(s) 410 may be configured to increment. In some examples, each time data from the contactless card 102 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The contactless card 101 is unable to determine the application transaction counter(s) 410 since there is no communication between applet(s) 408 on the contactless card 102.

In some examples, the counter(s) 410 may get out of sync. In some examples, to account for accidental reads that initiate transactions, such as reading at an angle, the counter(s) 410 may increment but the application does not process the counter(s) 410. In some examples, when the mobile device 10 is woken up, NFC may be enabled and the device 110 may be configured to read available tags, but no action is taken responsive to the reads.

To keep the counter(s) 410 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 410 increases in the appropriate sequence, then it possible to know that the user has done so.

The key diversification technique described herein with reference to the counter(s) 410, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
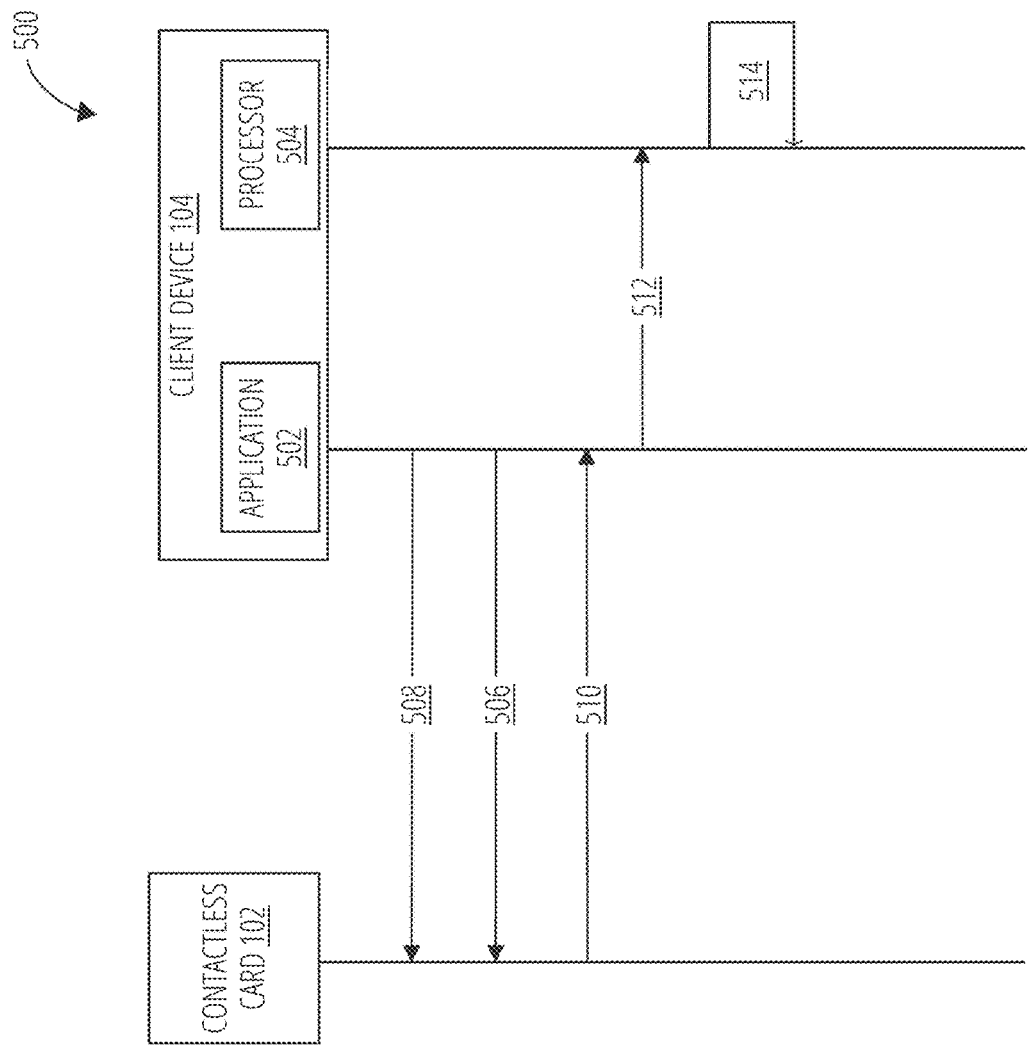
FIG. 5 illustrates a sequence flow 500 in accordance with one embodiment.

FIG. 5 is a timing diagram illustrating an example sequence for providing authenticated access according to one or more embodiments of the present disclosure. Sequence flow 500 may include contactless card 102 and client device 104, which may include an application 502 and processor 504.

At line 508, the application 502 communicates with the contactless card 102 (e.g., after being brought near the contactless card 102). Communication between the application 502 and the contactless card 102 may involve the contactless card 102 being sufficiently close to a card reader (not shown) of the client device 104 to enable NFC data transfer between the application 502 and the contactless card 102.

At line 506, after communication has been established between client device 104 and contactless card 102, contactless card 102 generates a message authentication code (MAC) cryptogram. In some examples, this may occur when the contactless card 102 is read by the application 502. In particular, this may occur upon a read, such as an NFC read, of a near field data exchange (NDEF) tag, which may be created in accordance with the NFC Data Exchange Format. For example, a reader application, such as application 502, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 502 may be configured to transmit a request to contactless card 102, the request comprising an instruction to generate a MAC cryptogram.

At line 510, the contactless card 102 sends the MAC cryptogram to the application 502. In some examples, the transmission of the MAC cryptogram occurs via NFC, however, the present disclosure is not limited thereto. In other examples, this communication may occur via Bluetooth, Wi-Fi, or other means of wireless data communication. At line 512, the application 502 communicates the MAC cryptogram to the processor 504.

At line 514, the processor 504 verifies the MAC cryptogram pursuant to an instruction from the application 122. For example, the MAC cryptogram may be verified, as explained below. In some examples, verifying the MAC cryptogram may be performed by a device other than client device 104, such as a server of a banking system in data communication with the client device 104. For example, processor 504 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 6:
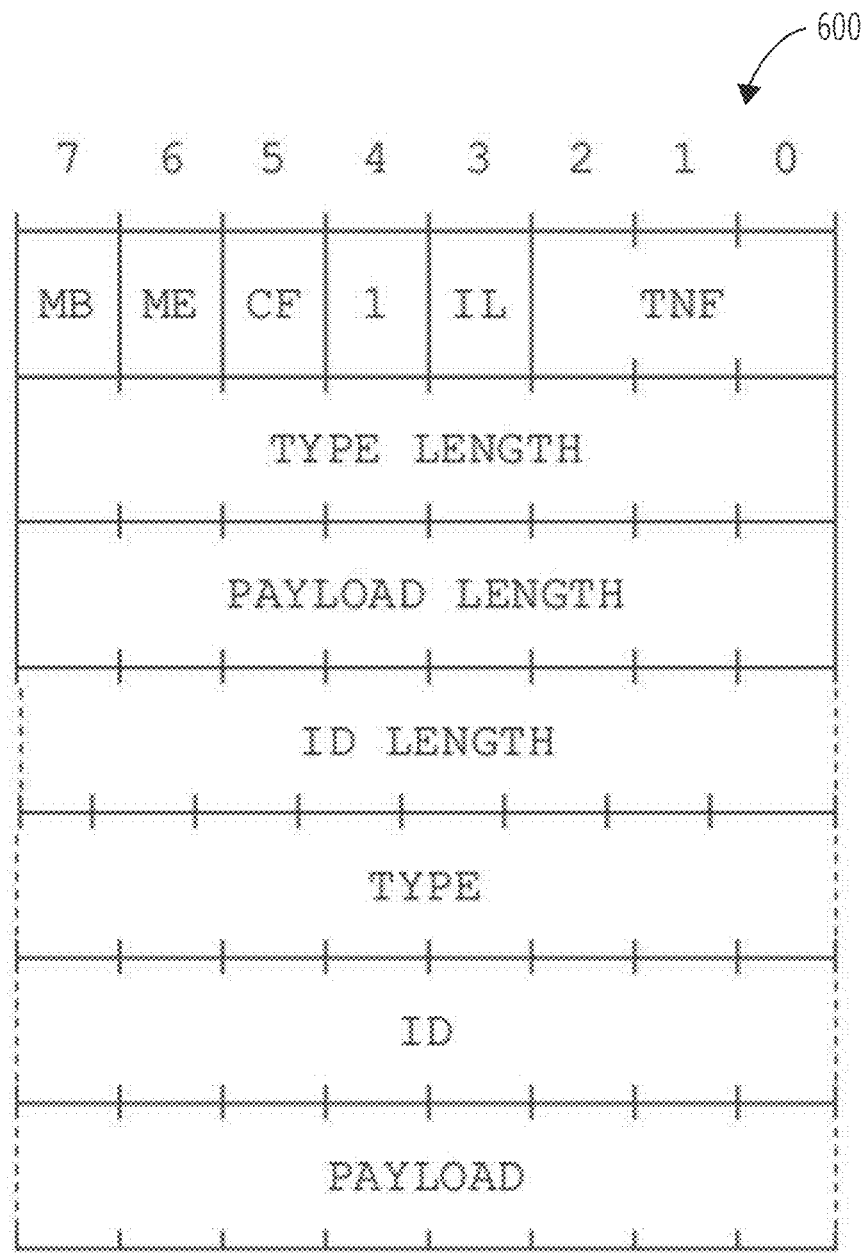
FIG. 6 illustrates a data structure 600 in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 7:
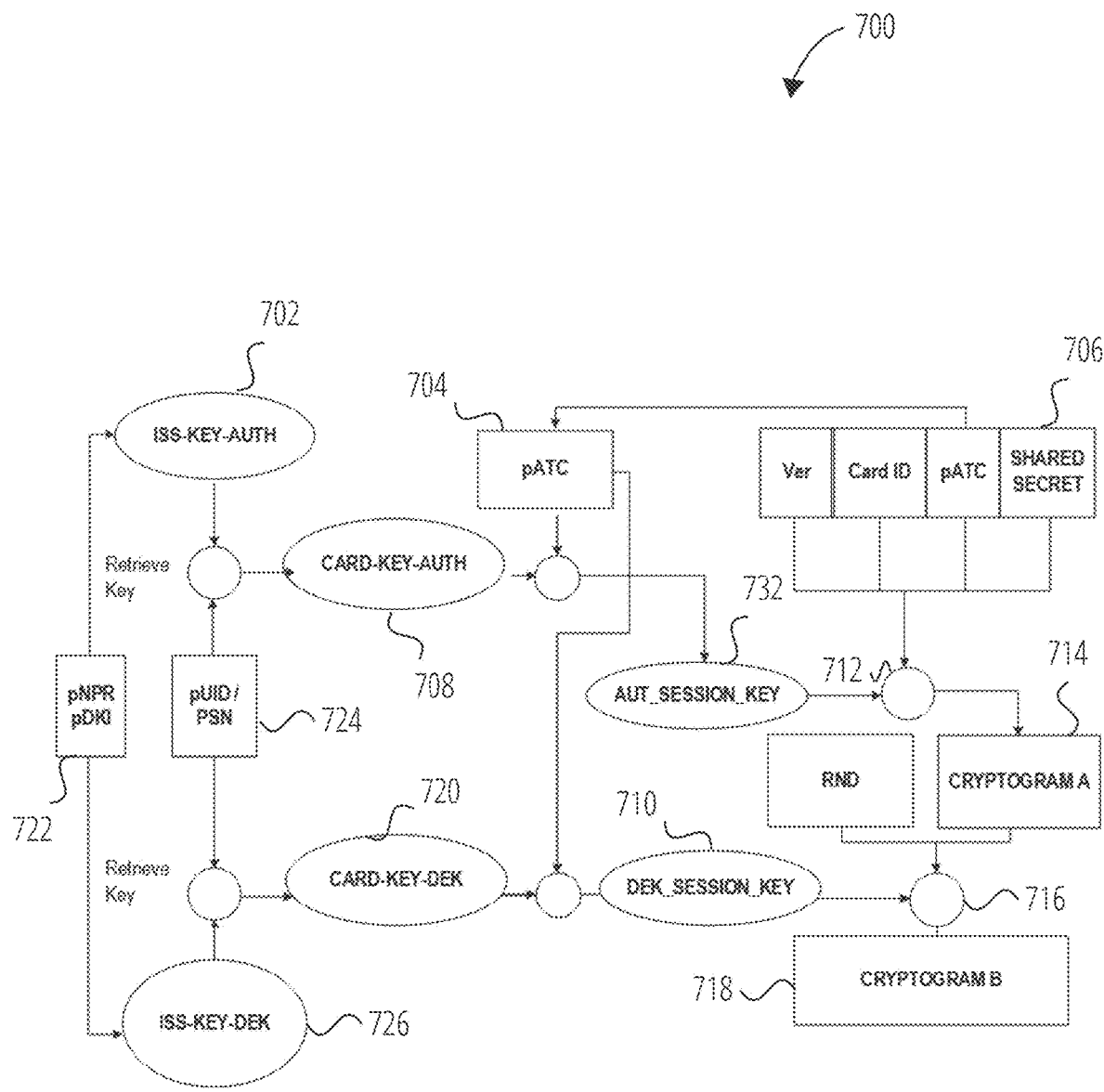
FIG. 7 is a diagram of a key system according to an example embodiment.

FIG. 7 illustrates a diagram of a system 700 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 702, 726 may be required for each part of the portfolio on which the one or more applets is issued. For example, the first master key 702 may comprise an Issuer Cryptogram Generation/Authentication Key (Iss-Key-Auth) and the second master key 726 may comprise an Issuer Data Encryption Key (Iss-Key-DEK). As further explained herein, two issuer master keys 702, 726 are diversified into card master keys 708, 720, which are unique for each card. In some examples, a network profile record ID (pNPR) 522 and derivation key index (pDKI) 724, as back office data, may be used to identify which Issuer Master Keys 702, 726 to use in the cryptographic processes for authentication. The system performing the authentication may be configured to retrieve values of pNPR 722 and pDKI 724 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 708 and Card-Key-Dek 720). The session keys (Aut-Session-Key 732 and DEK-Session-Key 710) may be generated by the one or more applets and derived by using the application transaction counter (pATC) 704 with one or more algorithms. To fit data into the one or more algorithms, only the 2 low order bytes of the 4-byte pATC 704 is used. In some examples, the four byte session key derivation method may comprise: F1:=PATC(lower 2 bytes)||'F0'||'00'||PATC (four bytes) F1:=PATC(lower 2 bytes)||'0F'||'00'||PATC (four bytes) SK:={(ALG (MK) [F1]||ALG (MK) [F2]}, where ALG may include 3DES ECB and MK may include the card unique derived master key.

As described herein, one or more MAC session keys may be derived using the lower two bytes of pATC 704 counter. At each tap of the contactless card, pATC 704 is configured to be updated, and the card master keys Card-Key-AUTH 508 and Card-Key-DEK 720 are further diversified into the session keys Aut-Session-Key 732 and DEK-Session-KEY 710. pATC 704 may be initialized to zero at personalization or applet initialization time. In some examples, the pATC counter 704 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 732. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 732, as explained above. As explained above, the low order two bytes of the counter may be used to diversify for the one or more MAC session keys. As explained below, AUT-Session-Key 732 may be used to MAC data 706, and the resulting data or cryptogram A 714 and random number RND may be encrypted using DEK-Session-Key 710 to create cryptogram B or output 718 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 710 derived from the Card-Key-DEK 720. In this case, the ATC value for the session key derivation is the least significant byte of the counter pATC 704.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0x43 (Message Type 'A') | Version | pATC | RND | Cryptogram A (MAC) |
| Cryptogram A (MAC) | 8 bytes | | | |
| Mac of | | | | |
| 2 | 8 | 4 | 4 | 18 bytes input data |
| Version | pUID | pATC | Shared Secret | |

| Message Format | | | | |
|---|---|---|---|---|
| 1 | 2 | 4 | 16 | |
| 0x43 (Message Type 'A') | Version | pATC | Cryptogram B | |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | | |
|---|---|---|---|---|---|
| 2 | 8 | 4 | 8 | 8 | |
| Version | pUID | pATC | RND | Cryptogram A (MAC) | |
| 8 bytes | | | | | |
| 8 | 8 | 4 | 4 | 18 bytes input data | |
| pUID | pUID | pATC | Shared Secret | | |

| Message Format | | | | |
|---|---|---|---|---|
| 2 | 8 | 4 | 16 | |
| Version | pUID | pATC | Cryptogram B | |
| 8 bytes | | | | |
| 8 | | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The UID field of the received message may be extracted to derive, from master keys Iss-Key-AUTH 902 and Iss-Key-DEK 1326, the card master keys (Card-Key-Auth 1308 and Card-Key-DEK 1320) for that particular card. Using the card master keys (Card-Key-Auth 908 and Card-Key-DEK 1320), the counter (pATC) field of the received message may be used to derive the session keys (Aut-Session-Key 1332 and DEK-Session-Key 1310) for that particular card. Cryptogram B 1318 may be decrypted using the DEK-Session-KEY, which yields cryptogram A 1314 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1314, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 732. The input data 706 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 712, data 706 is processed through the MAC using Aut-Session-Key 732 to produce MAC output (cryptogram A) 714, which is encrypted.

In order to provide additional protection against brute force attacks exposing the keys on the card, it is desirable that the MAC cryptogram 714 be enciphered. In some examples, data or cryptogram A 714 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 710. In the encryption operation 716, data or cryptogram A 714 and RND are processed using DEK-Session-Key 510 to produce encrypted data, cryptogram B 718. The data 714 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 8:
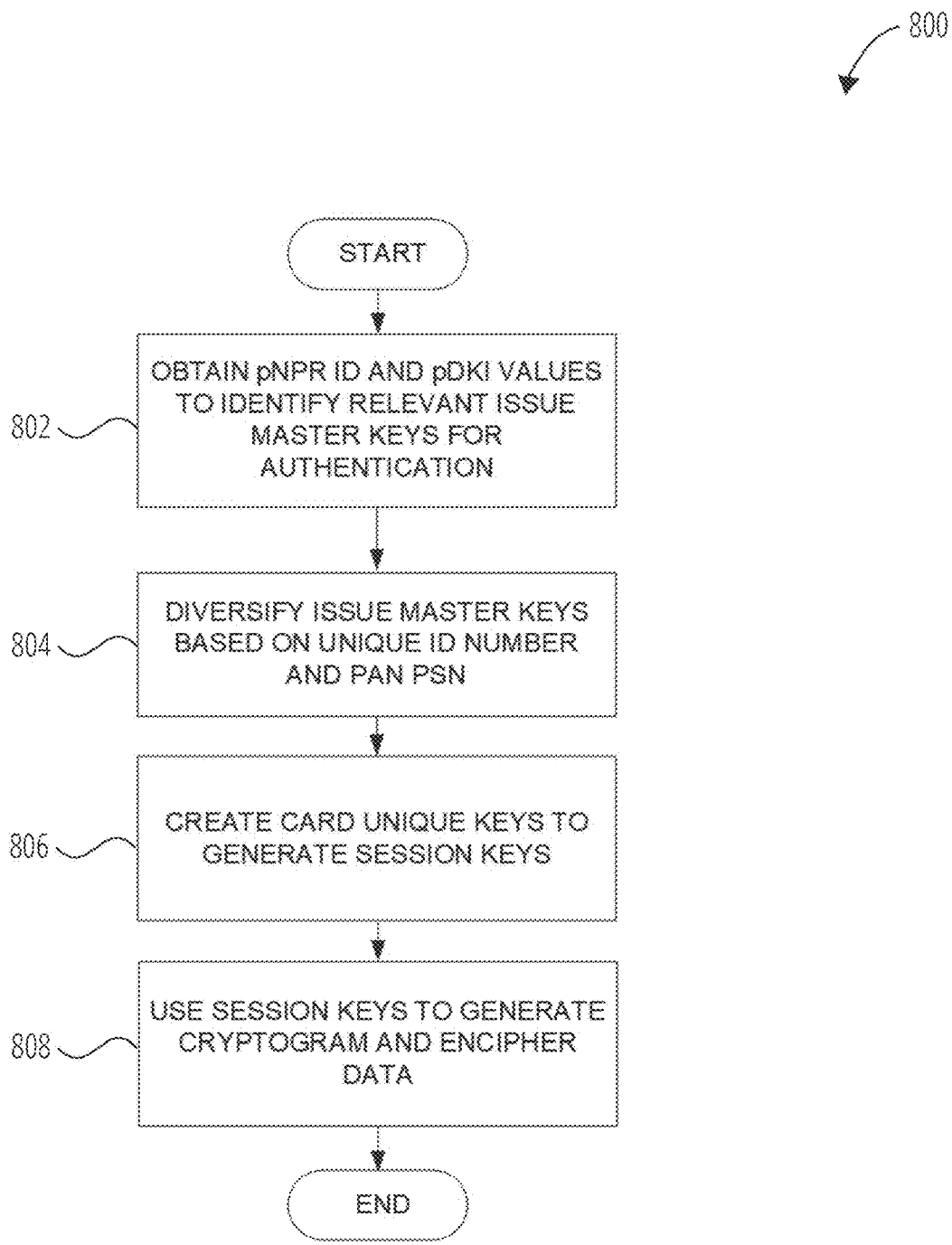
FIG. 8 is a flowchart of a method of generating a cryptogram according to an example embodiment.

FIG. 8 illustrates a method 800 for generating a cryptogram. For example, at block 802, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 804, Issuer Master Keys may be diversified by combining them with the card's unique ID number (pUID) and the PAN sequence number (PSN) of one or more applets, for example, a payment applet.

At block 806, Card-Key-Auth and Card-Key-DEK (unique card keys) may be created by diversifying the Issuer Master Keys to generate session keys which may be used to generate a MAC cryptogram.

At block 808, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 9:
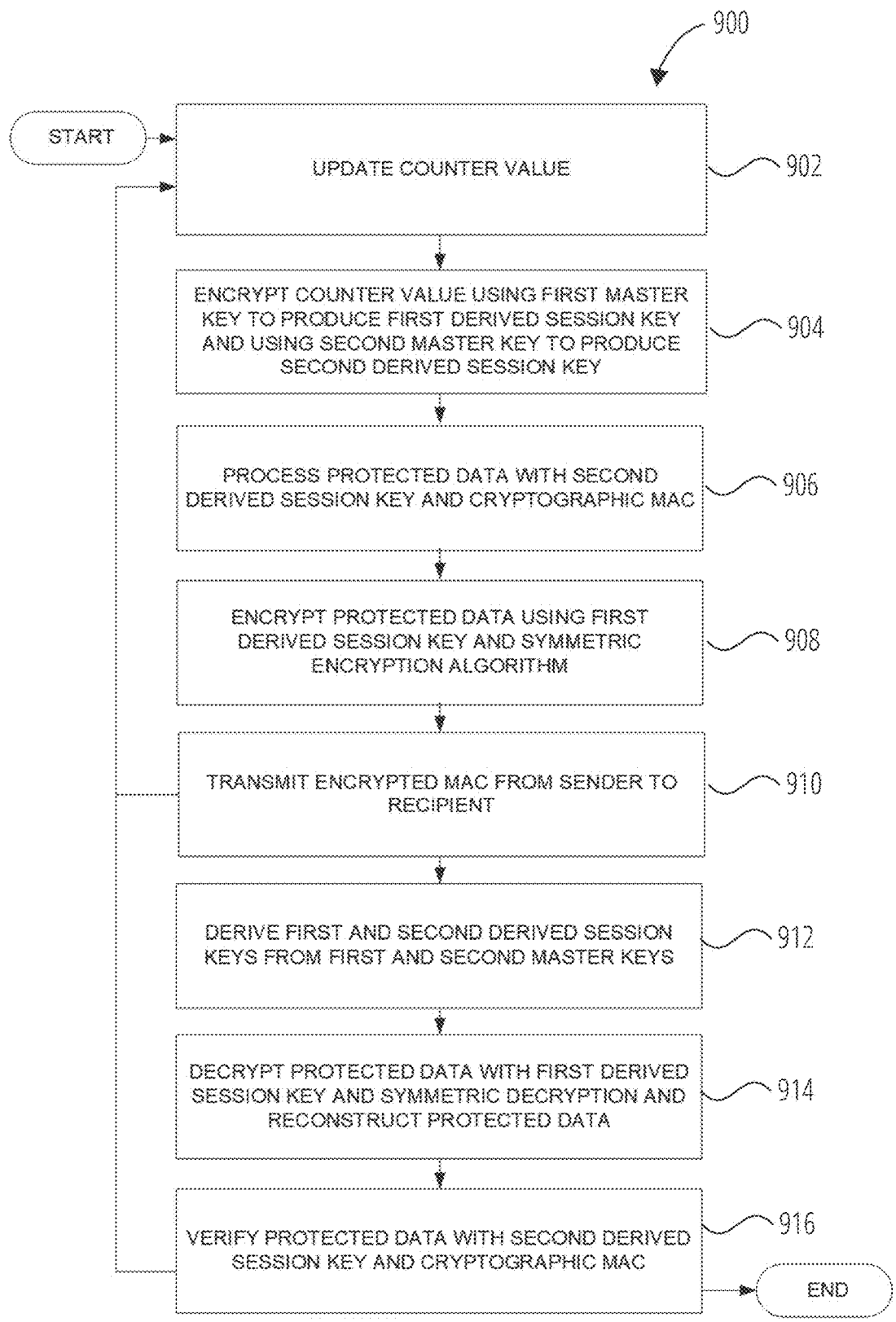
FIG. 9 illustrates an aspect of the subject matter in accordance with one embodiment.

FIG. 9 depicts an exemplary process 900 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 902, and other data, such as data to be protected, which it may secure share with the recipient.

At block 904, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 906, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 908, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 910, the encrypted MAC is transmitted, from the sender to the recipient, with sufficient information to identify additional secret information (such as shared secret, master keys, etc.), for verification of the cryptogram.

At block 912, the recipient uses the received counter value to independently derive the two derived session keys from the two master keys as explained above.

At block 914, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 916, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 902) and a new set of session keys may be created (at block 910). In some examples, the combined random data may be discarded.

Figure 10:
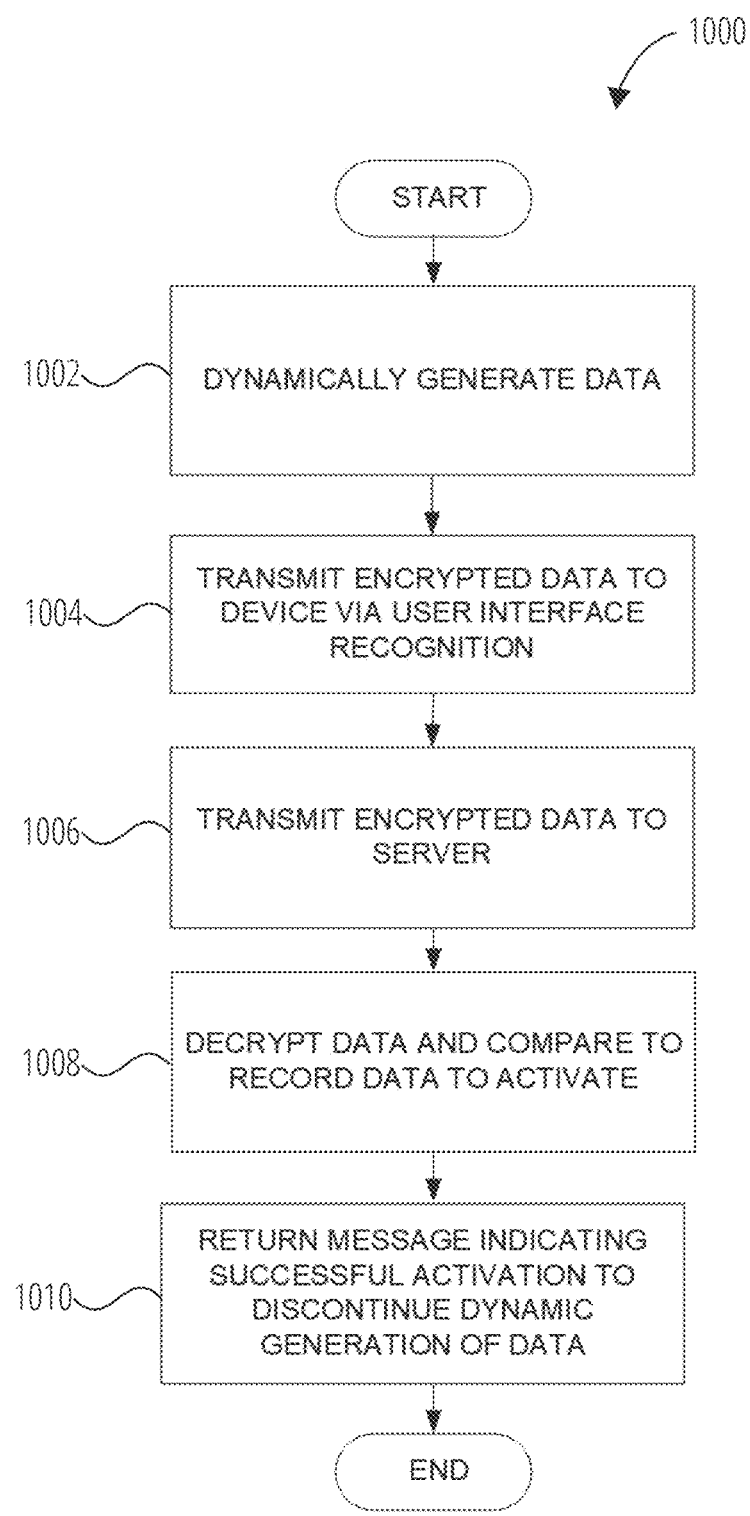
FIG. 10 illustrates an aspect of the subject matter in accordance with one embodiment.

FIG. 10 illustrates a method 800 for card activation according to an example embodiment. For example, card activation may be completed by a system including a card, a device, and one or more servers. The contactless card, device, and one or more servers may reference same or similar components that were previously explained a, such as contactless card 102, client device 104, and a server.

In block, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1004, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1006, the one or more portions of the data may be communicated to one or more servers, such as a card issuer server. For example, one or more encrypted portions of the data may be transmitted from the device to the card issuer server for activation of the card.

In block 1008, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1010, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

Some embodiments, as previously discussed, may be directed to performing authentication operations with a client device, such as a mobile device or phone. FIGS. 1-10 are generally directed to perform authentication with the contactless card based on the information on the card and the fact that the user holds the card. Thus, the contactless card satisfies a "something you have" aspect of an authentication operation. Additional embodiments discussed herein include utilizing the contactless card 102 with the client device 104 for authentication by "something you know."

For example, the contactless card 102 can be used with the client device 104 for the user to provide a pattern or sequence to the client device 104 based on the contactless card 102 interacting with the client device 104. Specifically, the contactless card 102 may be used to 'tap' or provide a sequence of signals or communications to the client device 104 via wireless communications detected by one or more antennas of the client device 104. For example, the user may tap or bring the contactless card 102 near the client device 104 two or more times, each detection made by the antenna(s) and transceiver(s) may be one pattern input. The pattern may be based on the number of inputs, the time length of inputs, the time length between inputs, or any combination thereof. The inputted pattern may be compared to an authentic pattern, either locally on the client device 104 or remotely on a server, to determine if they match and if the input pattern is authentic.

In embodiments, the pattern may be provided by a user interacting with a single antenna of the client device 104. However, more and more client devices 104 are being provided with two or more antennas providing more pattern options and a higher security level to generate a pattern. FIGS. 11-17 are generally directed to these operations and provide additional detail.

Figure 11:
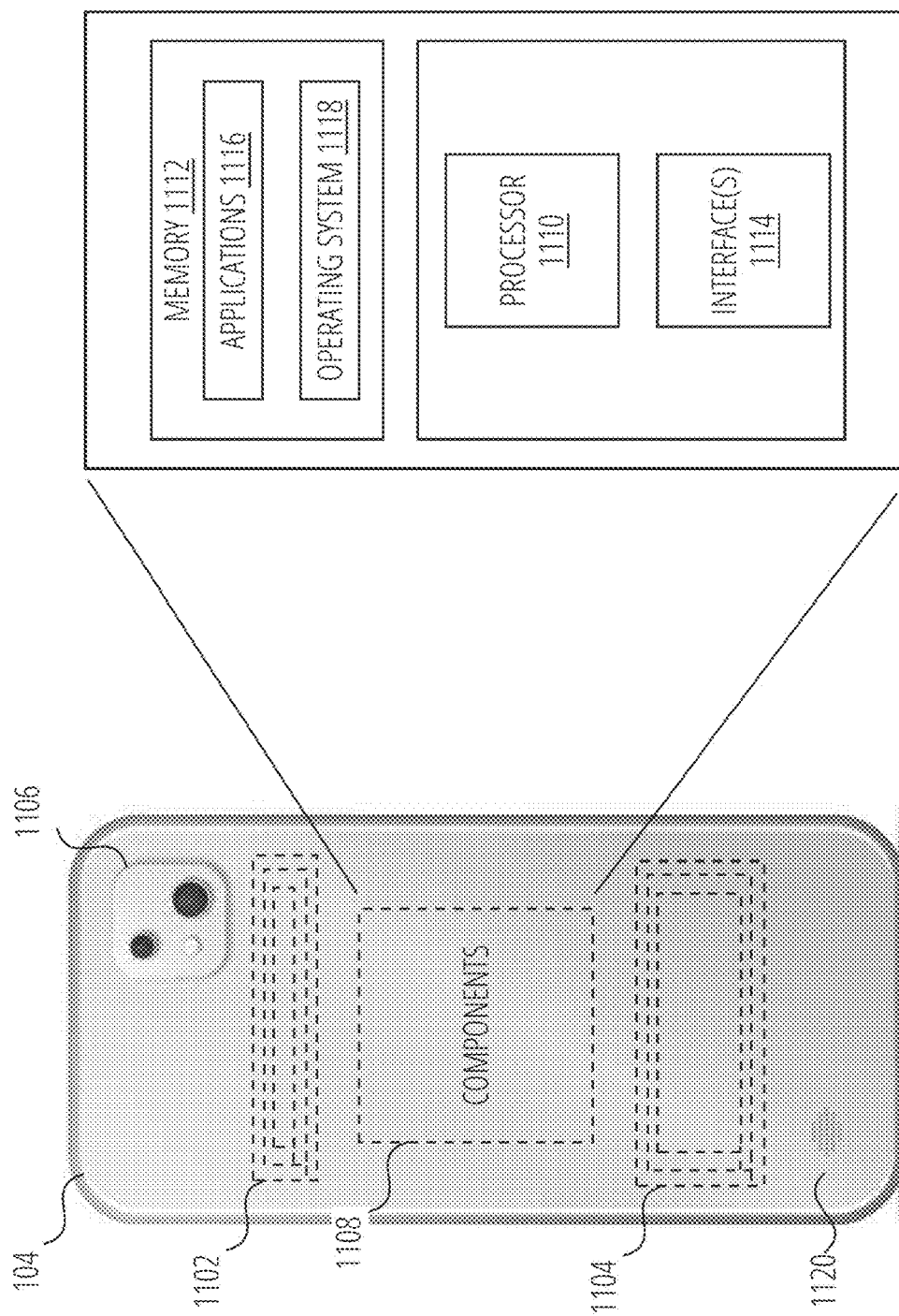
FIG. 11 illustrates an example of a client device 104 in accordance with embodiments.

FIG. 11 illustrates a rear view of the client device 104 and internal components represented by the dotted lines. In the illustrated configuration, the client device 104 includes two antennas, antenna 1102 and antenna 1104, and internal components 1108. However, the client device 104 may have a different number of antennas and still operate in accordance with the embodiments discussed herein. Additionally, FIG. 11 illustrates a limited number of components and typically the client device 104 will a number of circuits, chips, and other electronic components not illustrated. The backside of the client device 104 may also include additional components or devices, such as the camera assembly 1106 and speaker 1120. Embodiments are not limited in this manner.

In embodiments, the components 1108 may include a processor 1110, a memory 1112, and interface(s) 1114. The memory 1112 may be configured to store computer instructions configured to execute on the processor 1110. The instructions may be part of applications 1116 and the operating system 1118. However, embodiments are not limited in this manner.

The processor 1110 may be any type of processor, microprocessor, circuit, circuit elements (e.g., transistors, resistors, capacitors, inductors, and so forth), integrated circuit, application specific integrated circuits (ASIC), programmable logic devices (PLD), digital signal processor (DSP), field programmable gate array (FPGA), multi-core processor, and so forth.

In embodiments, the memory 1112 may be any type of memory configured to store instructions to be processed by the processor 1110. Examples of memory 1112 include volatile memory or non-volatile memory, removable or non-removable memory, erasable or non-erasable memory, writeable or re-writeable memory, and so forth.

The client device 104 also includes one or more interface (s) 1114. For example, the interface(s) 1114 may include a WiFi interface, a Bluetooth interface, an NFC interface, a serial bus interface, a universal serial bus (USB), etc. Embodiments are generally discussed with reference to making wireless communication detections via an NFC antenna(s) and transceiver(s); however, embodiments are not limited in this manner. In some instances, other wireless antennas/transceivers may be configured to make such detections, e.g., Bluetooth.

In embodiments, the memory 1112 includes applications 1116 and an operating system 1118. The applications 1116 may be any type of application configured to operate on the client device 104. Examples of applications may include social networking applications, communication applications, business productivity applications (email/word processor/spreadsheet), storefront applications, banking applications, money transfer applications, gaming applications, and so forth.

The applications 1116 may be configured to operate within the operating system 1118 environment. The operating system 1118 may be an Android® operating system, Apple IOS®, Windows Mobile Operating System®, and so forth. The operating system 1118 may be configured to provide services and instructions that execute and enable the software applications to operate with the hardware. For example, the operating system 1118 may be configured to operate with the transceiver/processor hardware to process the detections made by an antenna. In some instances, the operating system 1118 may provide data to the applications 1116 processed by the operating system 1118. The applications 1116 may further process the data, including performing authentications of the data, communicating the data to other devices or servers, and so forth. In other instances, at least a portion of the operating system 1118 may be configured to perform one or more of the authentication steps, e.g., in a secure computing environment. These and other details will become apparent in the following description.

Figure 12:
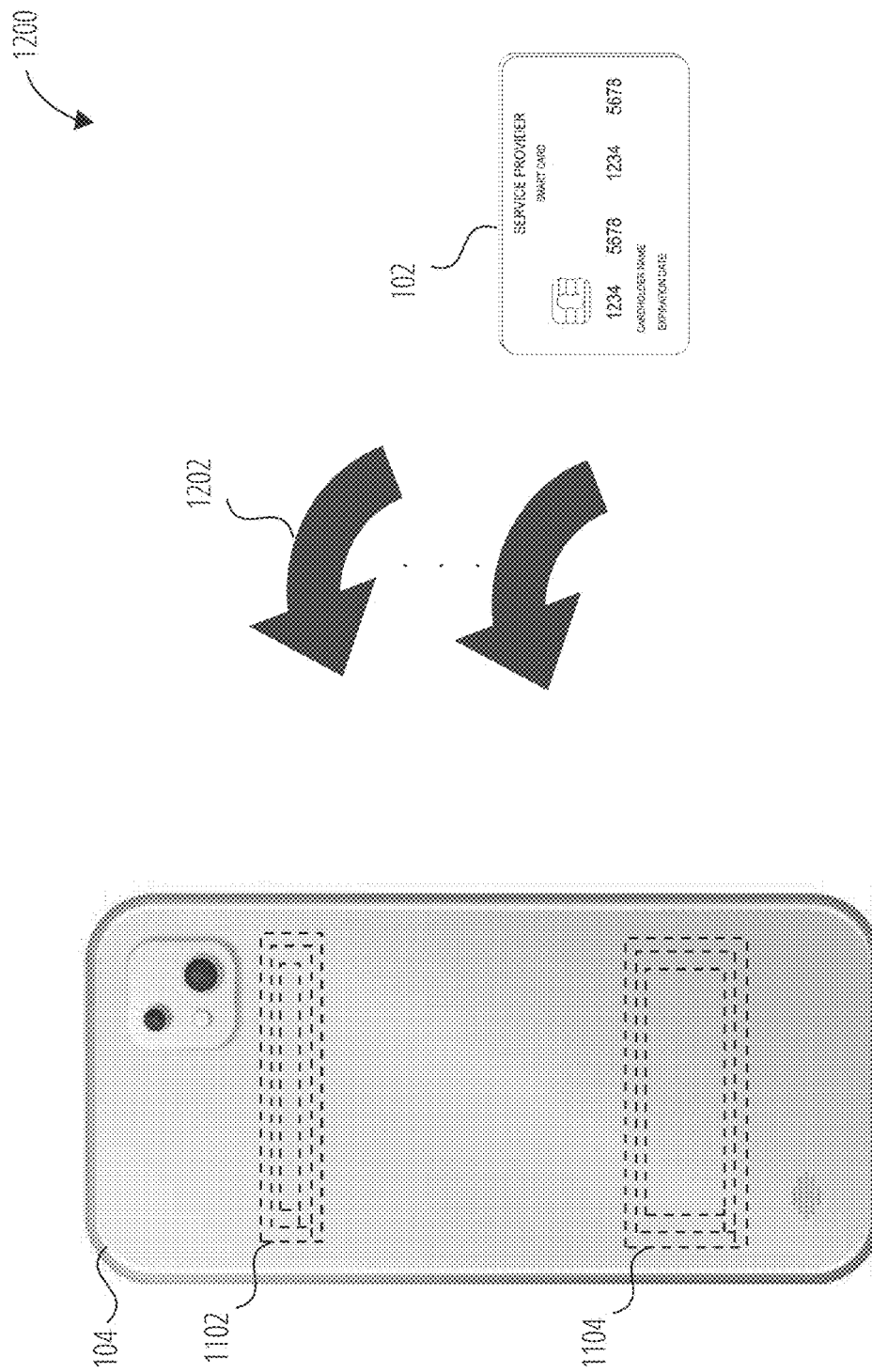
FIG. 12 illustrates an example of a system 1200 in accordance with embodiments.

FIG. 12 illustrates an example of a system 1200 in accordance with embodiments. The system 1200 includes the contactless card 102 and the client device 104. In the illustrated example, a user may tap the contactless card 102 to the client device 104 on or near an area of one of the antennas of the client device 104 to provide an input. The user may generate a pattern by tapping the contactless card 102 onto each of the one or more antennas of the client device 104 in a specific manner.

For example, the contactless card 102 may be tapped to the top antenna 1102 and the bottom antenna 1104 once to provide a particular sequence that can be used to authenticate the user or perform another operation. Embodiments are not limited to a particular number of taps and/or a particular order. For example, the user may provide six taps, two taps 1202 on or near the top antenna 1102, one tap 1202 on or near the bottom antenna 1104, and three taps 1202 on the top antenna 1102. Generally, the more number of taps 1202 the more secure the pattern.

In addition, the pattern may also include the length of the taps 1202. For example, a tap 1202 longer than a specific period of time may be considered a 'long' tap and a tap less than that time may be considered a 'short' tap. The pattern may include a combination of 'long' and 'short' taps 1202 with any combination of antennas. Moreover, embodiments are not limited to two lengths of taps (long/short); additional lengths may be considered, e.g., long, medium, short, and so forth. The period of times may be predefined and known to the user, e.g., ~1 sec=short, ~>1 sec-<~3 sec=medium, and >~3 sec=long.

Similarly, the period between taps 1202 may be considered part of the pattern. For example, the taps 1202 may be provided within quick succession, e.g., <~2 secs, or have longer period of time between them, e.g. >~2 secs. Thus, a user may provide 2 taps 1202 in quick succession and then wait longer to provide a third tap 1202. Similar to the length of taps, the pattern may define any number of length of times between taps, e.g., short, medium, long. These different input types may be provided in any combination, e.g., a number of inputs, sequence between a number of antennas, length of taps or inputs, and length between taps or inputs to create a pattern. In some embodiments, the system 1200 may require a particular number and/or combination of tap types to ensure that a user meets a minimum security requirement.

In instances, an input may be the user physically tapping the surface of the client device 104 above a location of an antenna housed in the housing. In other instances, an input or tap may only require the contactless card 102 to come within a defined distance of the client device 104 in a location near an antenna, e.g., a distance to perform an operation, such as a read operation. The contactless card 102 may also be detected by more than one antenna during a single tap attempt. In these instances, the tap may be registered for the antenna having the strongest signal detection. The strength of the wireless signal may be based on timing measurements, the measurement of signal strength in polling mode, carrier frequency measurement, reception sensitivity in polling mode, the measurement of load modulation (signal strength of the listener signal), etc.

In embodiments, the client device 104 may be configured to process each input, including signal and communication data, and determine a pattern used to perform authentication or another operation. In one example, one of the applications 1116 may be configured to request a user to input a pattern using the contactless card 102 and the one or more antennas of the client device 104. For example, the application may present a GUI interface and request the pattern to be inputted. The application receives the one or more inputs provided by the contactless card 102 being tapped and/or brought in range of the client device 104, determines the pattern, and compares the pattern to a stored authenticated pattern. If the patterns match, the application can authenticate the user.

In some instances, the application and/or operating system may be configured to provide the pattern of inputs to a server, and the server may perform the authentication operation, e.g., determine that the pattern matches a stored/authenticated pattern. The pattern may be provided to the server based on the characteristics of each of the inputs. The characteristics may include which antenna made the detection, the length of the detection, the length between the detections, the order of detections, and so forth. In embodiments, the data provided to the server may be encrypted using any type of encryption algorithm and key.

In embodiments, the pattern of taps or inputs may be used as a single authentication to enable a user to authenticate themselves. The authentication may enable the user to access an application or perform another operation. In some instances, the pattern of taps or inputs may be a factor in multi-factor authentication. For example, the pattern may be used in conjunction with another input or factor, e.g., biometric input, a password, a token, etc. In some instances, the pattern may be used with the authentication data provided by the contactless card 102 as part of the multi-factor authentication.

Figure 13:
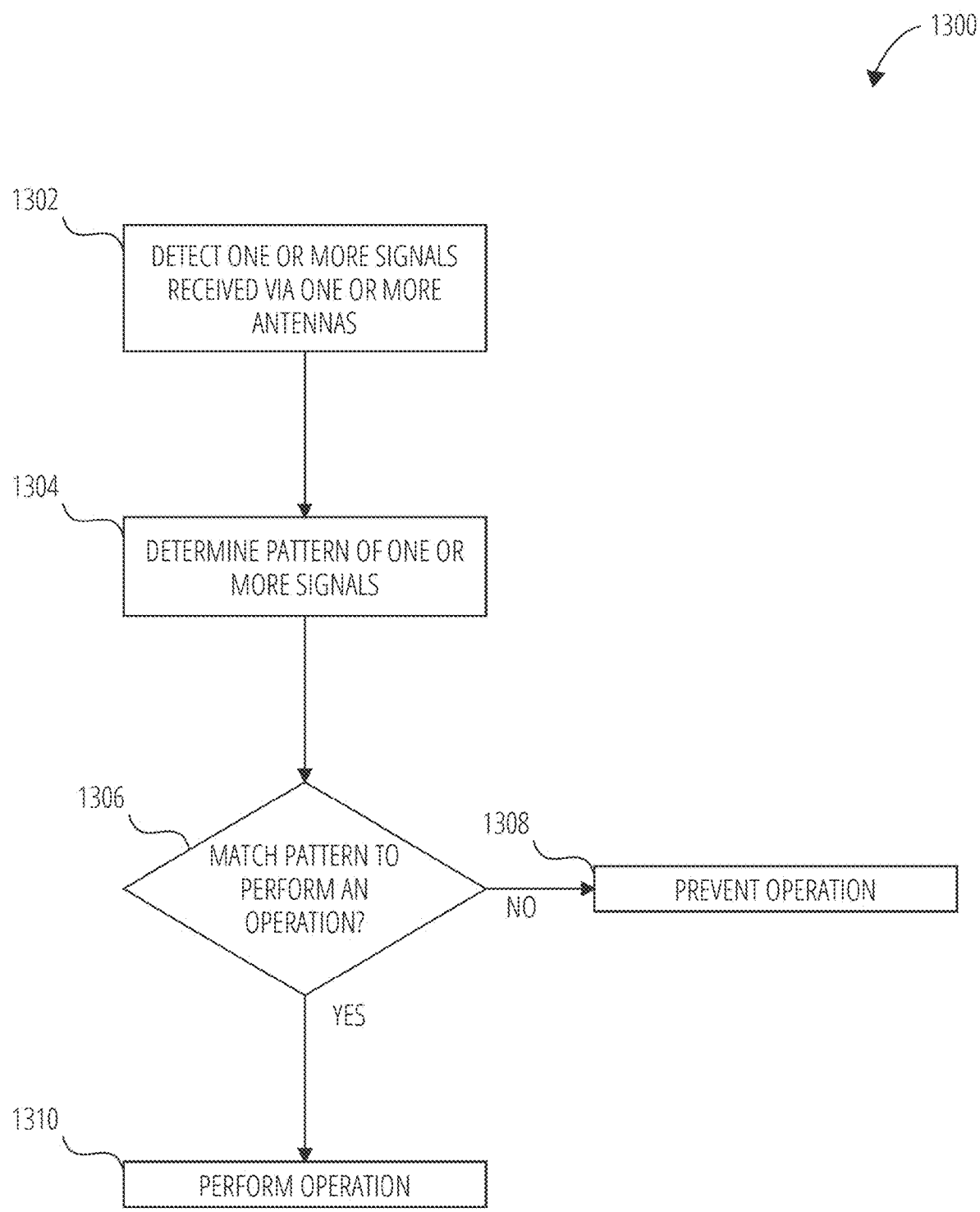
FIG. 13 illustrates an example of a routine 1300 in accordance with embodiments.

In some embodiments, the client device 104 may capture the authentication data from the contactless card 102 as part of the input pattern. The client device 104 and/or a server may perform the authentication operations to authenticate the data and the pattern of inputs to authenticate the user. As previously discussed, the authentication data may ensure that the user has the contactless card 102, and the pattern may ensure that the user knows the correct pattern. FIG. 13 illustrates one example processing flow that may be performed by a client device 104 to perform authentication with a pattern of taps or inputs.

FIG. 13 illustrates an example of a routine 1300 that may be performed in accordance with embodiments. Specifically, the routine 1300 is one example that may be performed by a device to perform authentication to enable an operation.

At block 1302, a device may detect one or more signals received via one or more antennas. In one example, one or more signals may be near-field communication (NFC) signals detected by NFC configured antennas. The NFC signals may or may not include data. In some instances, the NFC signals may include authentication data; in other instances, the signals may include null information or data. The device may detect the signals based on a load detected on circuitry, such as a transceiver. As previously discussed, if signals are detected by more than one antenna, the antenna and associated transceiver having the highest signal strength may register the signal. In some instances, the signal strength may be greater than a threshold value to register as a detected signal.

Each detected signal may have specific characteristics, including which antenna detected the signal, the length of the signal detection, the length of time between consecutive signals, etc. These characteristics may be used to determine a pattern in the signals. At block 1304, the device may determine a pattern of one or more signals.

At decision block 1306, the device may determine whether the pattern matches a stored and/or authenticated pattern. Specifically, the device may compare the received pattern with the stored pattern to determine whether they match. Each of the characteristics of the received pattern may be required to match the characteristics of the stored/authenticated pattern, for example. In some instances, the device may perform the authentication. In other instances, the device sends the pattern to a server, and the server may authenticate the pattern and return a result.

If the pattern does not match the authentic pattern, the routine 1300 includes blocking an operation at block 1308. However, if the pattern matches the authentic pattern, the routine 1300 includes enabling the operation at block 1310. The operation may be any type of operation performed by the device or another device. For example, the operation may include gaining access to the application, performing an operation within the application (accessing data/information), enabling another device to perform an operation (enabling a transaction), and so forth.

In some embodiments, the authentication result may be provided by the authentication device to another device. For example, an indication that the pattern is or is not authenticated may be provided to an application. An application or a server may provide the indication. Embodiments are not limited in this manner.

Figure 14:
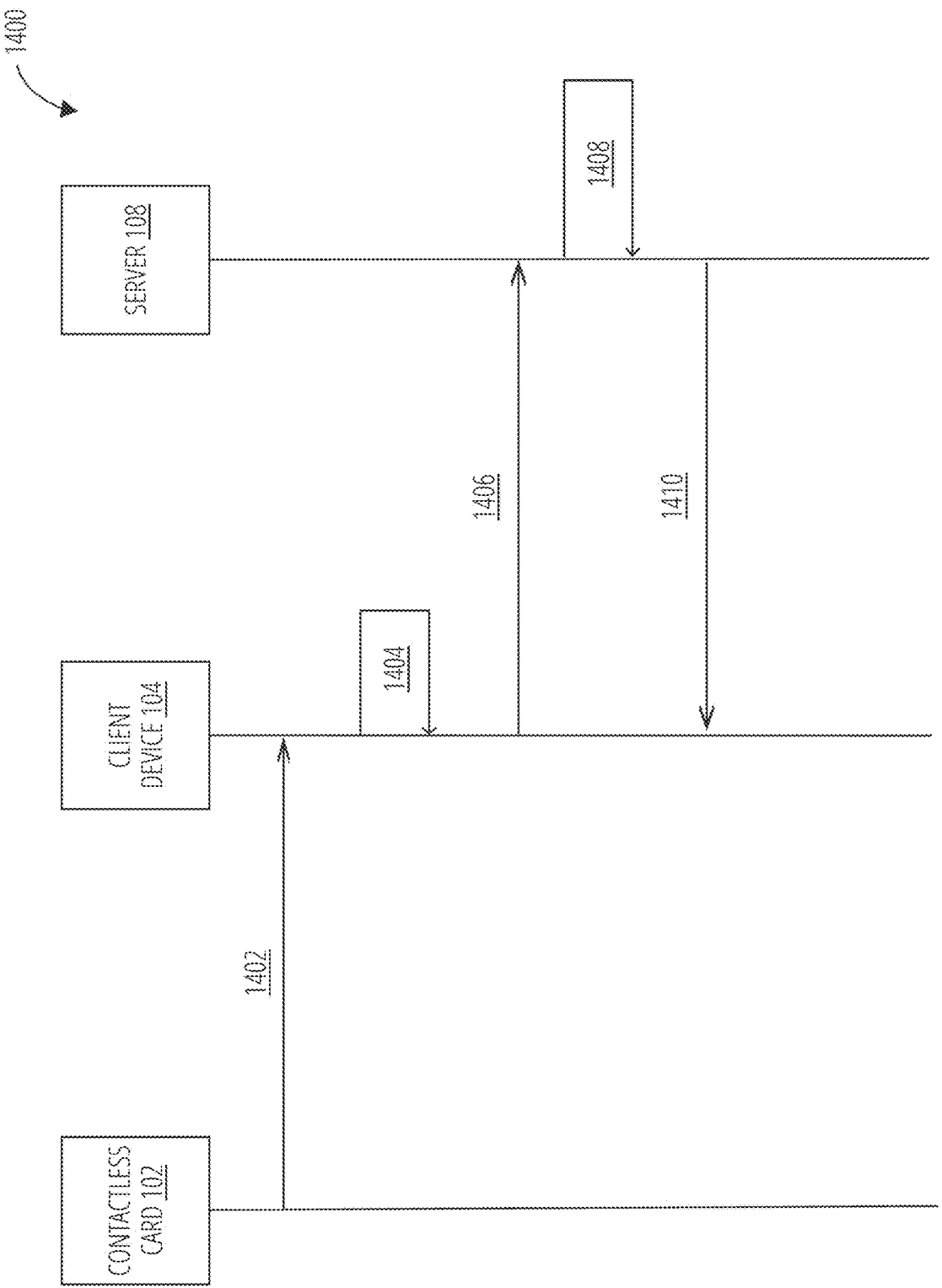
FIG. 14 illustrates an example of a sequence flow 1400 in accordance with embodiments.

FIG. 14 illustrates an example of a sequence flow 1400 in accordance with embodiments. In some instances, one or more authentication may be performed by a server, such as an authentication server maintained by a bank or a third-party authentication provider. In these instances, the client device may provide data for the card communications to the server to perform the authentication operations, as will be discussed in more detail.

At 1402, the contactless card 102 may be tapped or brought near the client device 104 and exchanged information with the client device 104. Line 1402 may represent a number of taps and communications between the contactless card 102 and client device 104. The taps may be in a pattern, as previously discussed. In some instances, authentication data stored on the contactless card 102 may also be provided to the client device 104 in these communications. The authentication data may be encrypted in a cryptogram and encrypted using the diversified key technique described herein.

The communications between the contactless card 102 and the client device 104 may be NFC communications and in accordance with one or more NFC protocols. However, embodiments are not limited in this manner, and other wireless technologies may be used in embodiments.

At 1404, the client device 104 may process the data and information received from the contactless card 102 and the pattern of taps. For example, the client device 104 may determine the pattern provided by the user with the contactless card 102 and characteristics corresponding to the taps. The client device 104 may encrypt the data and characteristics associated with the taps to securely communicate to the server 108.

At 1406 the client device 104 may provide the data corresponding to taps the server 108. In some instances, the client device 104 may only provide the encrypted pattern and the characteristics for the server 108 to authenticate. In other instances, the client device 104 may provide authentication data from the contactless card 102 to the server 108.

The client device 104 may provide the data to the server 108 via one or more wireless and/or wired connections. In some embodiments, the server 108 may be hosted by a banking system, and the data may be communicated via communication with one or more application programming interfaces (APIs) hosted by the server 108. In other instances, the server 108 may be maintained and hosted by a third-party provider, such as a cloud-computing provider, and the client device 104 may send the data via one or more APIs hosted by the third-party server. Embodiments are not limited in this manner.

At 1408, the server 108 may perform one or more authentication operations to authenticate the pattern of taps and, in some instances, the authentication data. The pattern of taps may be compared to a stored and authenticated pattern of taps associated with the user and the card. Comparing the patterns may include comparing the characteristics of each tap with stored characteristics. This may include comparing which antenna received a tap, the length of the tap, the time between taps, the sequence of the taps, etc.

Additionally, and as discussed herein, the server 108 may authenticate the authentication data. Specifically, the server 108 may ensure that the counter maintained by the contactless card 102 generally matches the associated counter maintained by the server 108. The server 108 may authenticate data stored on the card, such as a token or shared secret.

At 1410, the server 108 may return a result of one or more authentication processes. The result includes an indication as to whether the taps and/or the data are authenticated. The client device 104 may receive the indication and perform/prevent whatever operation the authentication is required.

Figure 15:
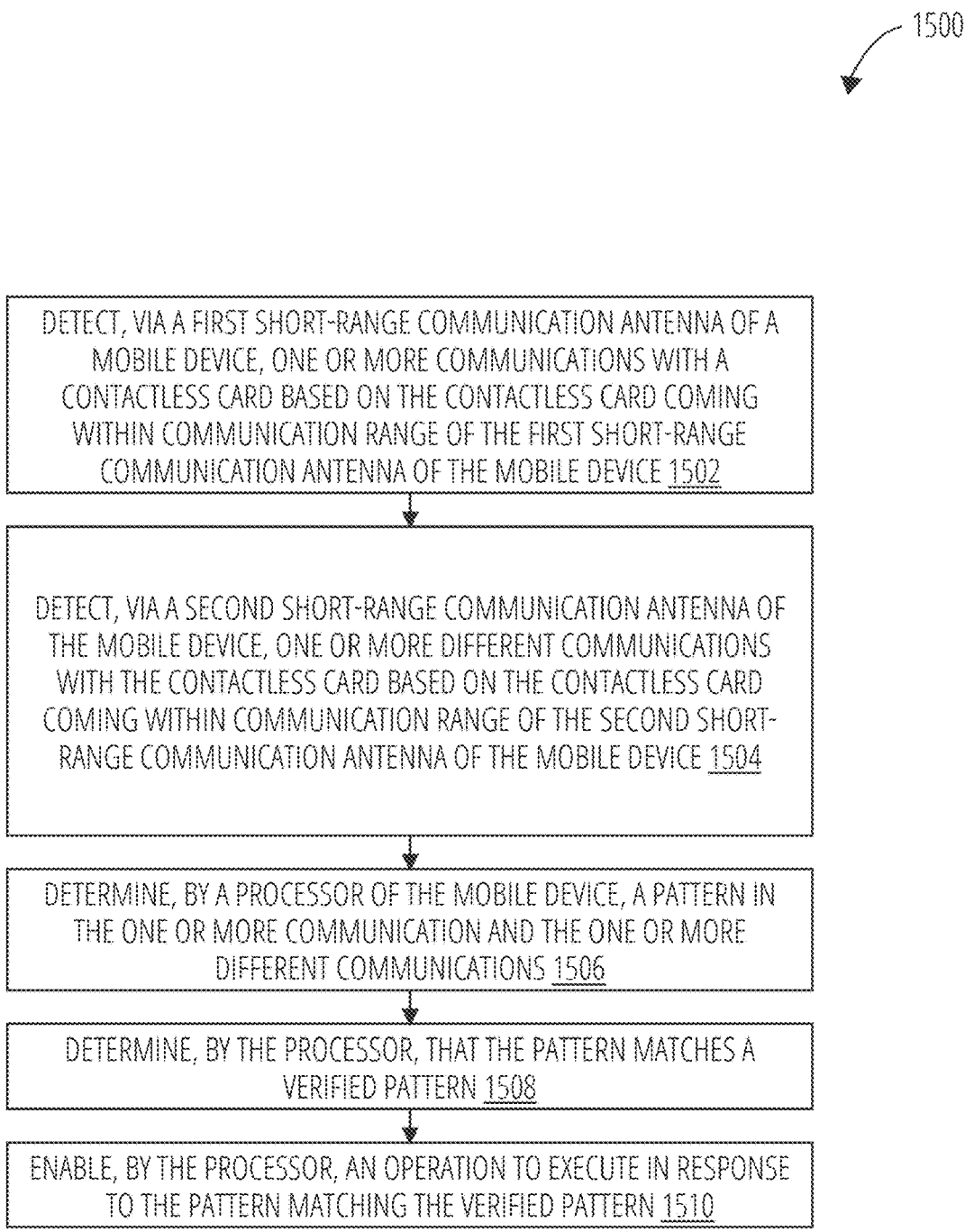
FIG. 15 illustrates a routine 1500 in accordance with embodiments.
Figure 16:
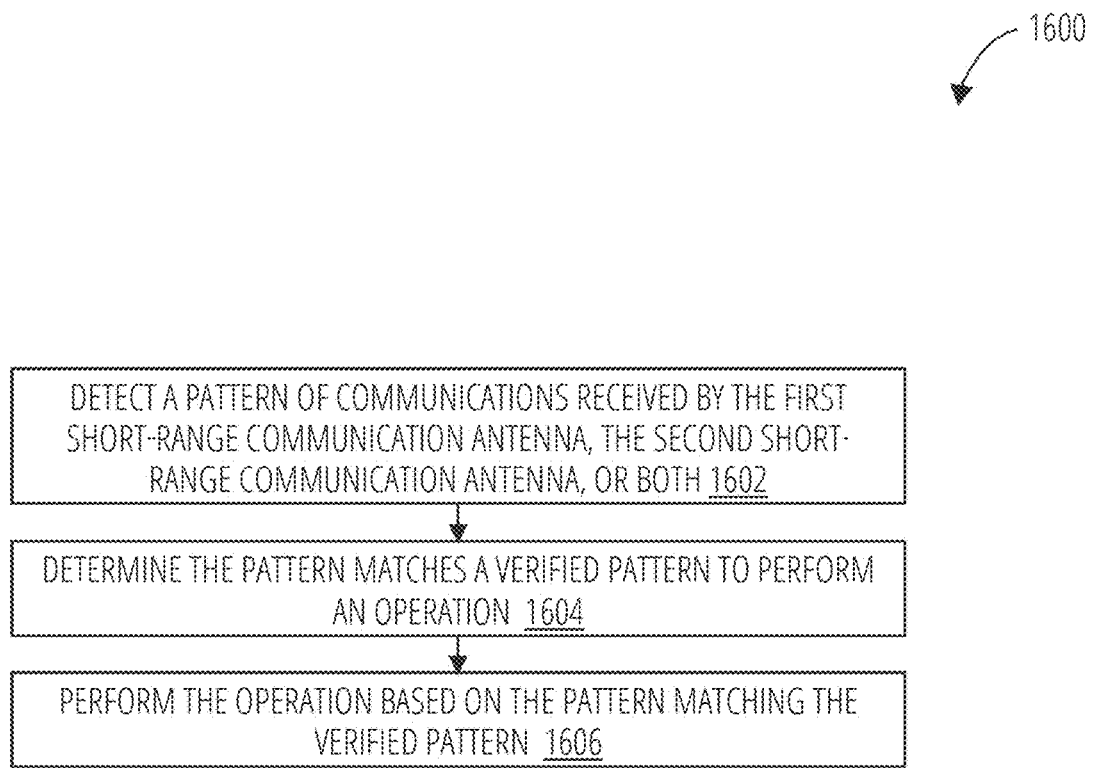
FIG. 16 illustrates a routine 1600 in accordance with embodiments.
Figure 17:
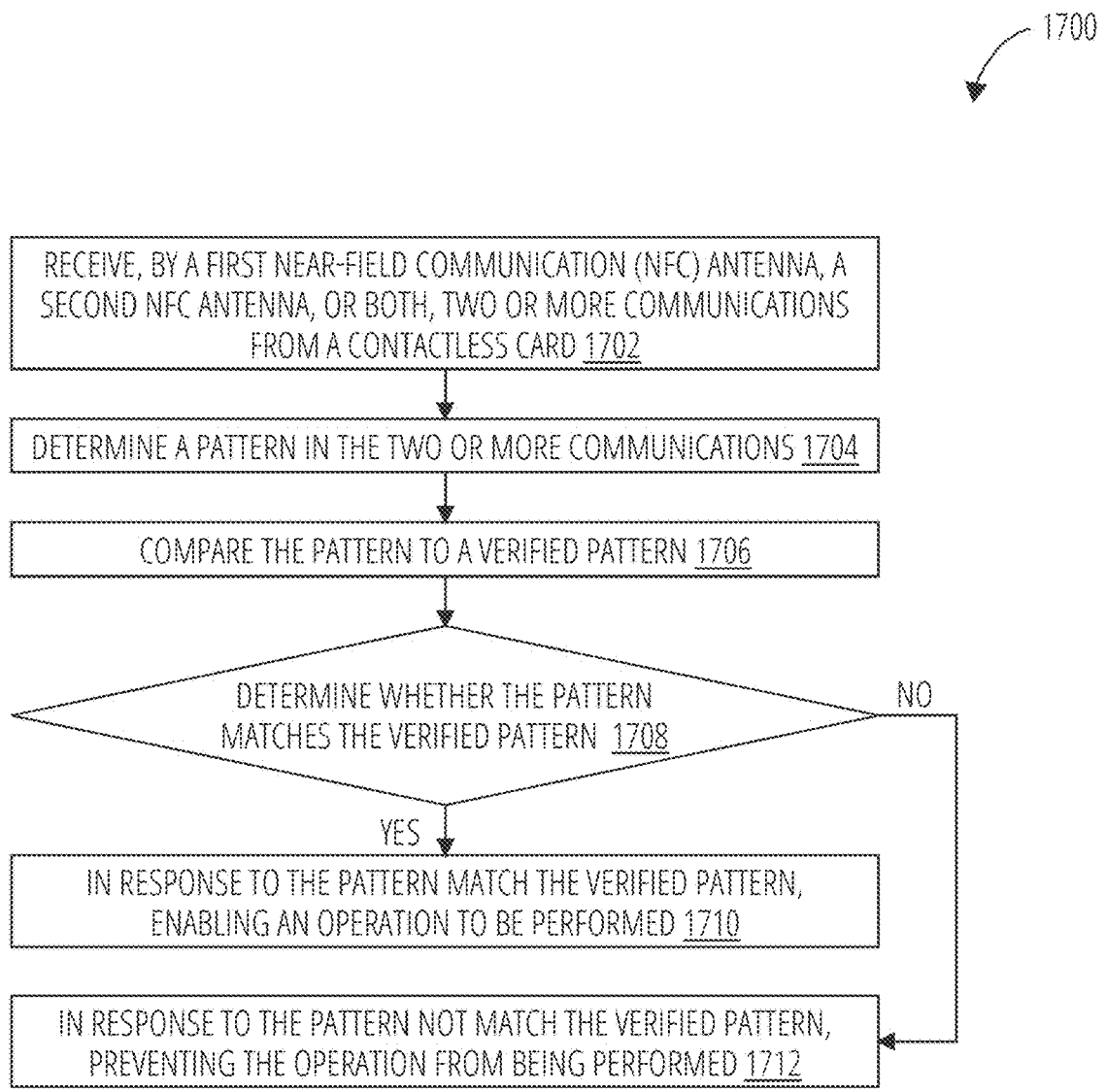
FIG. 17 illustrates a routine 1700 in accordance with embodiments.

The following FIGS. 15-17 and corresponding description generally discuss various processing flows that devices may perform to authenticate a user based on a pattern of taps provided. FIG. 15 illustrates an example of a routine 1500 that a mobile device may perform in accordance with embodiments.

In block 1502, routine 1500 detects, via a first short-range communication antenna of a mobile device, one or more communications with a contactless card based on the contactless card coming within the communication range of the first short-range communication antenna of the mobile device. The short-range communication antenna may be an NFC antenna configured to support NFC communications between the mobile device and other devices, such as a contactless card. The first short-range communication antenna may be located within the housing of the mobile device at a first location.

In block 1504, routine 1500 detects, via a second short-range communication antenna of the mobile device, one or more different communications with the contactless card based on the contactless card coming within communication range of the second short-range communication antenna of the mobile device, wherein the first short-range communication antenna and the second short-range communication antenna or different antennas. The second short-range communication antenna may also be an NFC antenna. It may be located at a second location, where the first and second locations are different.

In block 1506, routine 1500 determines, by a mobile device processor, a pattern based on one or more communications and the one or more different communications. The pattern may be based on the characteristics of each communication, including the sequence, the length of communication, the time between communications, etc.

In block 1508, routine 1500 determines, by the processor, that the pattern matches a verified pattern. And at block 1510, routine 1500 enables, by the processor, an operation to execute in response to the pattern matching the verified pattern. The operation may include gaining access to an application, performing an operation within the application, etc.

FIG. 16 illustrates another example routine 1600 that may be performed by a device, such as a mobile device.

In block 1602, routine 1600 detects a pattern of communications received by a first short-range communication antenna, a second short-range communication antenna, or both.

In block 1604, routine 1600 determines the pattern matches a verified pattern to operate. As discussed, the device may determine whether the patterns match based on the characteristics of the pattern. In some instances, the device may perform the detections and may authenticate the pattern. In other instances, the device may send the pattern to a server to perform authentication, and embodiments are not limited in this manner.

In block 1606, routine 1600 performs the operation based on the pattern matching the verified pattern.

FIG. 17 illustrates another example of a routine 1700 that may be performed by devices to authenticate a user via contactless card taps.

In block 1702, routine 1700 receives, by a first near-field communication (NFC) antenna, a second NFC antenna, or two or more communications from a contactless card. The communications may be signals generated when the contactless card comes within a defined distance of one of the antennas, e.g., ~10 centimeters (cm). Each communication includes characteristics, e.g., which antenna, time of the signal length, the period between signals, etc.

In block 1704, routine 1700 determines a pattern in the two or more communications. Specifically, the device may determine the pattern based on the characteristics of each of the signals. In block 1706, routine 1700 compares the pattern to a verified pattern, e.g., the characteristics received to the stored characteristics.

In decision block 1708, routine 1700 determines whether the pattern matches the verified pattern. In block 1710, routine 1700 in response to the pattern matches the verified pattern, enabling an operation to be performed. In block 1712, routine 1700 in response to the pattern not matches the verified pattern, preventing the operation from being performed.

Figure 18:
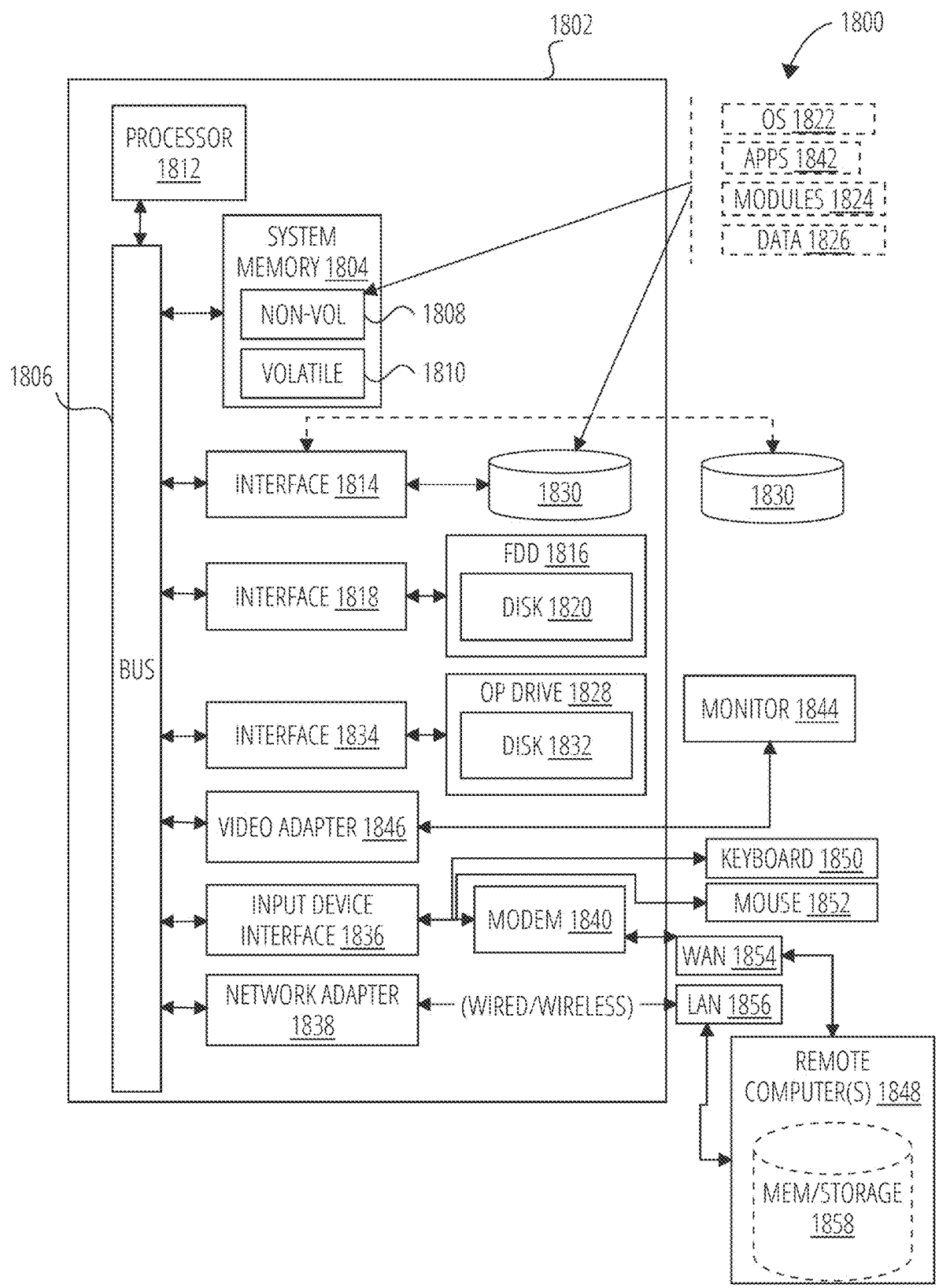
FIG. 18 illustrates a computer architecture 1800 in accordance with one embodiment.

FIG. 18 illustrates an embodiment of an exemplary computer architecture 1800 suitable for implementing various embodiments as previously described. In one embodiment, the computer architecture 1800 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 18, the computing architecture 100 includes a processor 1812, a system memory 1804 and a system bus 1806. The processor 1812 can be any of various commercially available processors.

The system bus 1806 provides an interface for system components including, but not limited to, the system memory 1804 to the processor 1812. The system bus 1806 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 18, the system memory 1804 can include non-volatile 1808 and/or volatile 1810. A basic input/output system (BIOS) can be stored in the non-volatile 1808.

The computer 1802 may include various types of computer-readable storage media in the form of one or more lower speed memory units, including an internal (or external) hard disk drive 1830, a magnetic disk drive 1816 to read from or write to a removable magnetic disk 1820, and an optical disk drive 1828 to read from or write to a removable optical disk 1832 (e.g., a CD-ROM or DVD). The hard disk drive 1830, magnetic disk drive 1816 and optical disk drive 1828 can be connected to system bus 1806 the by an HDD interface 1814, and FDD interface 1818 and an optical disk drive interface 1834, respectively. The HDD interface 1814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1808, and volatile 1810, including an operating system 1822, one or more applications 1842, other program modules 1824, and program data 1826. In one embodiment, the one or more applications 1842, other program modules 1824, and program data 1826 can include, for example, the various applications and/or components of the systems discussed herein.

A user can enter commands and information into the computer 1802 through one or more wire/wireless input devices, for example, a keyboard 1850 and a pointing device, such as a mouse 1852. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1812 through an input device interface 1836 that is coupled to the system bus 1806 but can be connected by other interfaces such as a parallel port, IEEE 1394 serial port, a game port, a USB port, an IR interface, and so forth.

A monitor 1844 or other type of display device is also connected to the system bus 1806 via an interface, such as a video adapter 1846. The monitor 1844 may be internal or external to the computer 1802. In addition to the monitor 1844, a computer typically includes other peripheral output devices, such as speakers, printers, and so forth.

The computer 1802 may operate in a networked environment using logical connections via wire and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all the elements described relative to the computer 1802, although, for purposes of brevity, only a memory and/or storage device 1858 is illustrated. The logical connections depicted include wire/wireless connectivity to a local area network 1856 and/or larger networks, for example, a wide area network 1854. Such LAN and WAN networking environments are commonplace in offices and companies, and facilitate enterprise-wide computer networks, such as intranets, all of which may connect to a global communications network, for example, the Internet.

When used in a local area network 1856 networking environment, the computer 1802 is connected to the local area network 1856 through a wire and/or wireless communication network interface or network adapter 1838. The network adapter 1838 can facilitate wire and/or wireless communications to the local area network 1856, which may also include a wireless access point disposed thereon for communicating with the wireless functionality of the network adapter 1838.

When used in a wide area network 1854 networking environment, the computer 1802 can include a modem 1840, or is connected to a communications server on the wide area network 1854 or has other means for establishing communications over the wide area network 1854, such as by way of the Internet. The modem 1840, which can be internal or external and a wire and/or wireless device, connects to the system bus 1806 via the input device interface 1836. In a networked environment, program modules depicted relative to the computer 1802, or portions thereof, can be stored in the remote memory and/or storage device 1858. It will be appreciated that the network connections shown are exemplary and other means of establishing a communications link between the computers can be used.

The computer 1802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 19:
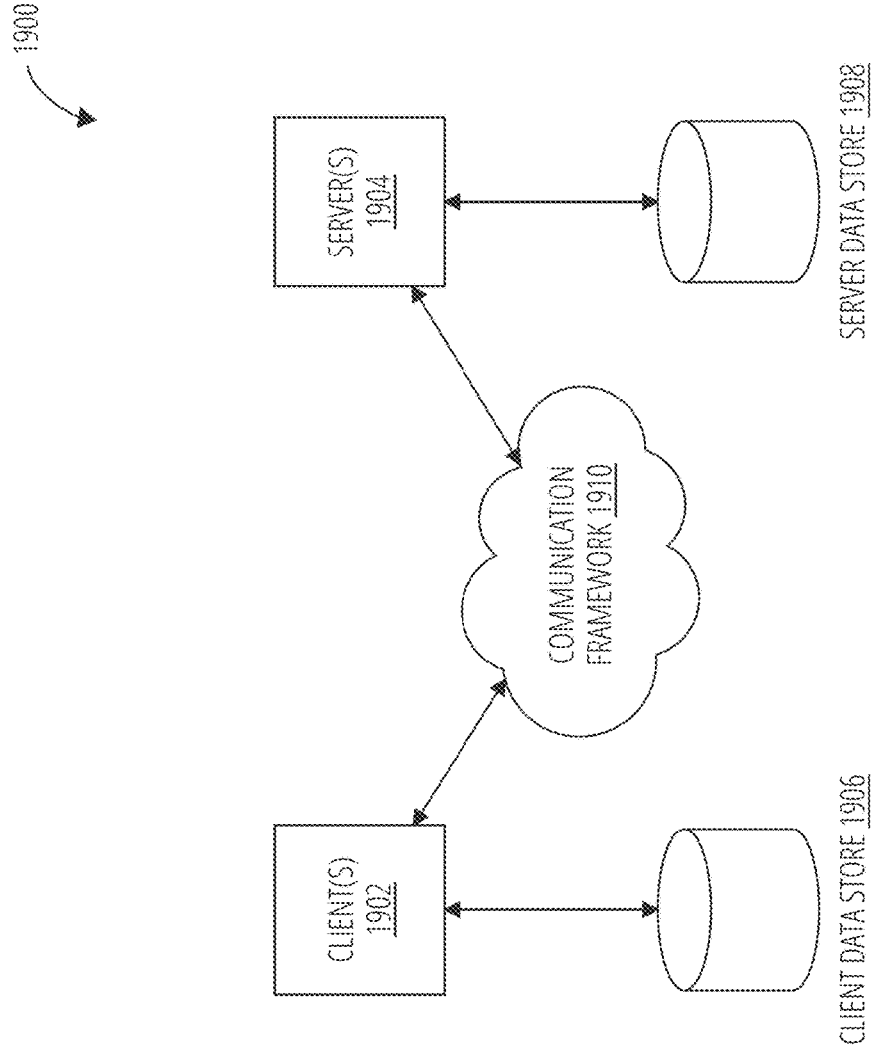
FIG. 19 illustrates a communications architecture 1900 in accordance with one embodiment.

FIG. 19 is a block diagram depicting an exemplary communications architecture 1900 suitable for implementing various embodiments as previously described. The communications architecture 1900 includes various common communications elements, such as a transmitter, receiver, transceiver, radio, network interface, baseband processor, antenna, amplifiers, filters, power supplies, and so forth. The embodiments, however, are not limited to implementation by the communications architecture 1900, which may be consistent with systems and devices discussed herein.

As shown in FIG. 19, the communications architecture 1900 includes one or more client(s) 1902 and server(s) 1904. The server(s) 1904 may implement one or more functions and embodiments discussed herein. The client(s) 1902 and the server(s) 1904 are operatively connected to one or more respective client data store 1906 and server data store 1908 that can be employed to store information local to the respective client(s) 1902 and server(s) 1904, such as cookies and/or associated contextual information.

The client(s) 1902 and the server(s) 1904 may communicate information between each other using a communication framework 1910. The communication framework 1910 may implement any well-known communications techniques and protocols. The communication framework 1910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1902 and the server(s) 1904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A computer-implemented method, comprising:
   detecting, via a first short-range communication antenna of a mobile device, one or more communications with a contactless card based on the contactless card coming within communication range of the first short-range communication antenna of the mobile device;
   detecting, via a second short-range communication antenna of the mobile device, one or more different communications with the contactless card based on the contactless card coming within communication range of the second short-range communication antenna of the mobile device, wherein the first short-range communication antenna and the second short-range communication antenna are different antennas;
   determining, by a processor of the mobile device, a pattern in the one or more communication and the one or more different communications;
   determining, by the processor, that the pattern matches a verified pattern; and
   enabling, by the processor, an operation to execute in response to the pattern matching the verified pattern.

2. The computer-implemented method of claim 1, wherein the pattern is based on a number of detections made by the first short-range communication antenna and the second short-range communication antenna.

3. The computer-implemented method of claim 1, wherein the pattern is based on a sequence of detections made by the first short-range communication antenna and the second short-range communication antenna.

4. The computer-implemented method of claim 1, wherein the pattern is based on timing between each of the detections made by the first short-range communication antenna and the second short-range communication antenna.

5. The computer-implemented method of claim 1, wherein determining whether the pattern matches the verified pattern is one factor of a multi-factor operation.

6. The computer-implemented method of claim 1, wherein a second factor is authenticating data of the contactless card, and the method comprising:
   receiving, via the first short-range communication antenna or the second short-range communication antenna, data in at least one of the one or more communications detected by the first short-range communication antenna or the one or more communications detected by the second short-range communication antenna; and
   determining, by the processor, that the data matches verified data prior to enabling the performance of the operation.

7. The computer-implemented method of claim 1, wherein determining the data matches the verified data comprises:
   sending, by the processor, the data to a server to perform the verification that the data matches verified data; and
   receiving, by the processor, a response indicating the data is verified.

8. The computer-implemented method of claim 1, wherein the operation comprises one of accessing an application on the mobile device, logging into an account, auto-filling data in a field, launching an application on the mobile device, providing a verification to another device, providing a token to gain access to a door, or any combination thereof.

9. The computer-implemented method of claim 1, wherein the one or more communications detected by the first short-range communication antenna and the one or more communications detected by the second short-range communication antenna are near-field communications.

10. The computer-implemented method of claim 9, wherein each of the near-field communications comprise a successful read operation.

11. An apparatus, comprising:
a first short-range communication antenna;
a second short-range communication antenna;
a memory configured to store instructions; and
a processor coupled with the memory, the first short-range communication antenna, and the second short-range communication antenna, the processor configured to process the instructions, that when executed cause the processor to:
   detect a pattern of communications received by the first short-range communication antenna, the second short-range communication antenna, or both;
   determine the pattern matches a verified pattern to perform an operation; and
   perform the operation based on the pattern matching the verified pattern.

12. The apparatus of claim 11, wherein the pattern comprises at least one communication detected by the first short-range communication antenna and at least one communication detected by the second short-range communication antenna.

13. The apparatus of claim 11, wherein the pattern is based on a timing between communications, a sequence of communications, a number of communications, or a combination thereof.

14. The apparatus of claim 11, wherein the pattern is one factor in a multi-factor verification and data within one or more of the communications is another factor in the multi-factor verification.

15. The apparatus of claim 14, wherein the instructions further cause the processor to:
receive the data in the one or more communications;
send the data to a server to perform the verification that the data matches verified data; and
receive a response indicating the data is verified.

16. A non-transitory computer-readable medium comprising instructions that, when executed by a processor, causes the processor to:
   receive, by a first near-field communication (NFC) antenna, a second NFC antenna, or both, two or more communications from a contactless card;
   determine a pattern in the two or more communications;
   compare the pattern to a verified pattern;
   determine whether the pattern matches the verified pattern;
   in response to the pattern matching the verified pattern, enable an operation to be performed; and
   in response to the pattern not matching the verified pattern, prevent the operation from being performed.

17. The non-transitory computer-readable medium of claim 16, wherein the pattern comprises at least one communication detected by the first NFC communication antenna and at least one communication detected by the second NFC communication antenna.

18. The non-transitory computer-readable medium of claim 16, wherein the pattern is based on a timing between communications, a sequence of communications, a number of communications, or a combination thereof.

19. The non-transitory computer-readable medium of claim 16, wherein the pattern is one factor in a multi-factor verification and data within one or more of the communications is another factor in the multi-factor verification.

20. The non-transitory computer-readable medium of claim 16, the processor to:
receive the data in the one or more communications;
send the data to a server to perform the verification that the data matches verified data; and
receive a response indicating the data is verified.

* * * * *